United States Patent
Sugawara et al.

(10) Patent No.: US 7,187,496 B2
(45) Date of Patent: Mar. 6, 2007

(54) MANUFACTURING METHOD OF OPTICAL DEVICE, OPTICAL DEVICE, MANUFACTURING METHOD OF FARADAY ROTATOR, AND OPTICAL COMMUNICATION SYSTEM

(75) Inventors: Tamotsu Sugawara, Chuo-ku (JP); Atsushi Ohido, Chuo-ku (JP)

(73) Assignee: TDK Corporation, Tokyo (JP)

( * ) Notice: Subject to any disclaimer, the term of this patent is extended or adjusted under 35 U.S.C. 154(b) by 228 days.

(21) Appl. No.: 10/382,655

(22) Filed: Mar. 7, 2003

(65) Prior Publication Data

US 2003/0174397 A1   Sep. 18, 2003

(30) Foreign Application Priority Data

Mar. 14, 2002   (JP)   .............................. 2002-070576
May 30, 2002   (JP)   .............................. 2002-157098

(51) Int. Cl.
G02B 27/28   (2006.01)
G02B 5/30   (2006.01)

(52) U.S. Cl. ...................... 359/484; 359/500; 359/280; 359/324

(58) Field of Classification Search ................ 359/484, 359/495, 500, 280, 324; 117/2; 372/37
See application file for complete search history.

(56) References Cited

U.S. PATENT DOCUMENTS

| 5,161,049 | A | * | 11/1992 | Tanno et al. | ................. 359/281 |
| 5,872,652 | A | * | 2/1999 | Shiono et al. | .............. 359/484 |
| 5,898,516 | A | * | 4/1999 | Shirai et al. | ................. 359/324 |
| 6,055,102 | A | * | 4/2000 | Park | ........................... 359/484 |
| 2002/0139293 | A1 | * | 10/2002 | Shirai et al. | .................... 117/2 |
| 2004/0027637 | A1 | * | 2/2004 | Sahashi et al. | ............. 359/280 |

FOREIGN PATENT DOCUMENTS

| JP | A 6-222311 | 8/1994 |
| JP | 08201745 A | * 8/1996 |
| JP | 408201745 A | * 8/1996 |
| JP | A 10-115815 | 5/1998 |
| JP | A 2000-089165 | 3/2000 |

* cited by examiner

*Primary Examiner*—Leonidas Boutsikaris
(74) *Attorney, Agent, or Firm*—Oliff & Berridge, PLC

(57) ABSTRACT

There are provided a manufacturing method of an optical device excellent in expediency, and a technique for stably manufacturing a high performance optical device. After a single crystal film which constitutes a Faraday rotator and can exhibit a substantially rectangular magnetic hysteresis, is obtained, the single crystal film is magnetized in a state where this single crystal film is incorporated in an optical device such as an optical isolator. By performing a magnetizing step after the Faraday rotator is incorporated in the optical device, it becomes unnecessary to discriminate between the front and back surfaces of the single crystal film, and the characteristics of the optical device are also improved.

4 Claims, 14 Drawing Sheets

FORWARD DIRECTION →

MAGNETIC FIELD APPLICATION DIRECTION

MANUFACTURING METHOD OF OPTICAL DEVICE, OPTICAL DEVICE, MANUFACTURING METHOD OF FARADAY ROTATOR, AND OPTICAL COMMUNICATION SYSTEM

BACKGROUND OF THE INVENTION

1. Field of the Invention

The present invention relates to a Faraday rotator used for an optical communication system, an optical device, such as an optical isolator, using the Faraday rotator, and an optical communication system including the optical device.

2. Description of the Related Art

At present, in connection with electric communication having a low transmission capacity, the spread of optical communication has been accelerated. As described below, the reason is summarized such that the optical communication enables high speed and large capacity transmission, is advantageous in long distance transmission since the number of relays may be small, and is not influenced by electromagnetic noise.

Light is identical to an electric wave used for TV/radio broadcast or wireless communication in electromagnetic waves. However, the frequency of the electromagnetic wave used for the optical communication is about 200 THz and is about 20000 times as high as that of satellite broadcast (about 10 GHz). That the frequency is high means that the wavelength is short, and a large number of signals can be transmitted at high speed all the more. Incidentally, the wavelength (center wavelength) of the electromagnetic wave used for the optical communication is 1.31 μm and 1.55 μm.

As is well known, an optical fiber used for the optical communication has a double structure of glasses having different refractive indexes. Since light transmitted through the center core repeats reflection in the inside of the core, even if the optical fiber is bent, a signal is accurately transmitted. Further, since high purity quartz glass having high transparency is used for the optical fiber, attenuation in the optical communication is no more than about 0.2 dB per km. Accordingly, transmission for about 100 km is enabled without using an amplifier, and the number of relays can be reduced as compared with the electric communication.

Although EMI (Electromagnetic Interference) becomes a problem in the electric communication, the communication using the optical fiber is not influenced by noise by electromagnetic induction. Thus, very high quality information transmission can be made.

In the present optical communication system, an electric signal is converted into an optical signal by an LD (Laser Diode) of an optical transmitter, this optical signal is transmitted through an optical fiber, and then, it is converted into an electric signal by a PD (Photo Diode) of an optical receiver. As stated above, elements indispensable to the optical communication system are the LD, the PD, the optical fiber and the optical connector. Apart from a relatively low speed and near distance communication system, in a high speed and long distance communication system, in addition to the above elements, it becomes necessary to provide an optical transmission equipment such as an optical amplifier or an optical distributor, and an optical part (optical device) applied to the equipment, such as an optical isolator, an optical circulator, an optical coupler, an optical separator, an optical switch, an optical modulator, or an optical attenuator.

In high speed and long distance transmission or a multi-branching optical communication system, the optical isolator is especially important. In the present optical communication system, the optical isolator is used in the LD module of the optical transmitter and the relay. The optical isolator is an optical part having a function to transmit an electromagnetic wave only in one direction and to block an electromagnetic wave returned by reflection on the way. The optical isolator employs a Faraday effect as a kind of magneto-optical effect. The Faraday effect is a phenomenon in which a polarization plane of light having passed through a Faraday rotator formed of a material exhibiting the Faraday effect, that is, a rare earth iron garnet single crystal film or the like is rotated. The property that the polarization direction of light is rotated, such as the Faraday effect, is called optical activity. However, differently from normal optical activity, in the Faraday effect, even if the traveling direction of light is reversed, a state is not restored, and the polarization direction is further rotated. An element using the phenomenon that the polarization direction of light is rotated by the Faraday effect is called a Faraday rotator.

The function of the optical isolator will be described while an LD module is used as an example.

An LD is made the LD module in which it is integrated with an optical fiber and is incorporated in an optical transmitter. An optical isolator is disposed between the LD and the Optical fiber, and functions to check reflected return light to the LD by using the Faraday effect. The reflected return light is light that is returned after light emitted from the LD is slightly reflected by a part such as an optical connecter. The reflected return light causes noise to be generated in the LD. The optical isolator allowing light to pass only in one direction removes this noise and keeps communication quality.

In the case of the LD of the optical transmitter, since the oscillation direction (polarization direction) of light emitted from the LD is determined to be one direction, a polarization dependency type optical isolator with a simple structure is used. The basic structure of a conventional polarization dependency type optical isolator 10 is shown in FIG. 19. The optical isolator 10 includes a Faraday rotator 11 made of a garnet single crystal film, a cylindrical permanent magnet 12 surrounding the Faraday rotator 11 and magnetizing the Faraday rotator 11, and polarizers 13 and 14 disposed on both front and back surfaces of the Faraday rotator 11. The polarizers 13 and 14 are disposed so that their polarizing axes have a relative angle of 45°. Incidentally, in the optical isolator 10, a direction in which light travels is called a forward direction, and a direction in which light is reflected and returned is called a reverse direction.

The Faraday rotator affects the performance of the optical isolator. Accordingly, the property of a material constituting the Faraday rotator is important for obtaining the high performance optical isolator. Important points of selection of the material constituting the Faraday rotator are that a Faraday rotation angle at a use wavelength (in the case of an optical fiber, 1.31 μm, 1.55 μm) is large, and transparency is high. As the material satisfying such conditions, YIG (yttrium iron garnet, $Y_3Fe_5O_{12}$) was used at the beginning, however, it was insufficient in mass production and miniaturization.

Thereafter, it has been found that when a rare earth site of garnet crystal is substituted with bismuth (Bi), the Faraday rotational capacity is remarkably improved, and after this, this Bi substitutional rare earth iron garnet single crystal has been used for the Faraday rotator.

Incidentally, in the conventional bismuth substitutional rare earth iron garnet single crystal, the Faraday rotation angle indicates a definite value in a magnetic field not lower than the saturation magnetic field. In the magnetic field lower than the saturation magnetic field, the Faraday rotation angle is in proportion to the magnitude of the magnetic field, and when the external magnetic field is removed, the Faraday effect disappears. Thus, as shown in FIG. 19, in the conventional optical isolator 10, the permanent magnet 12 for applying the magnetic field not lower than the saturation magnetic field to the Faraday rotator 11 is disposed.

Also with respect to the optical isolator 10, similarly to the other equipments and parts, there is a demand for miniaturization and cost reduction. However, it can be said that the existence of this permanent magnet 12 prevents the miniaturization and cost reduction of the optical isolator 10.

In the conventional bismuth substitutional rare earth iron garnet single crystal, when the external magnetic field is removed, the Faraday effect disappears, and therefore, it can be said that the single crystal is a soft magnetic material. Thus, the disposition of the permanent magnet 12 is indispensable. However, if hard magnetism, that is, a property (latching) capable of keeping the Faraday rotation angle even if the external magnetic field is removed can be given to the bismuth substitutional rare earth iron garnet single crystal, the disposition of the permanent magnet 12 can be omitted. The omission of the permanent magnet 12 produces the miniaturization and cost reduction of various equipments and parts using the optical isolator or the Faraday effect. Thus, the bismuth substitutional rare earth iron garnet single crystal has been developed.

For example, JP-A-6-222311 discloses a bismuth substitutional rare earth iron garnet single crystal film grown by an LPE (Liquid Phase Epitaxial) method, in which an external magnetic field is applied in the direction crossing the surface of the single crystal film to cause magnetic saturation, and then, even if the external magnetic field is removed, the Faraday rotation effect at the time of the magnetic saturation is held. It is disclosed that in this single crystal film, when the external magnetic field not lower than the saturation magnetization is applied, even if the external magnetic field is removed, the Faraday rotation angle is kept.

As described above, the bismuth substitutional rare earth iron garnet single crystal film having the hard magnetism is proposed. In this hard magnetic single crystal film, differently from the conventional soft magnetic single crystal film requiring the disposition of the permanent magnet 12, a magnetization direction becomes very important. That is, in the conventional optical isolator 10 shown in FIG. 19, since the magnetization direction of the Faraday rotator 11 made of the soft magnetic single crystal film is determined by the direction of the permanent magnet 12, the front and back surfaces of the Faraday rotator 11 do not especially need to be discriminated from each other. However, in the optical device which does not require the disposition of the permanent magnet 12 and uses the Faraday rotator made of the hard magnetic single crystal film, it is necessary to discriminate the magnetization direction of the Faraday rotator to which the external magnetic field is applied, that is, the front and back surfaces of the Faraday rotator. If the optical device such as the optical isolator is mistakenly assembled with respect to the magnetization direction of the Faraday rotator, the optical device does not function at all.

However, since the front and back surfaces of the Faraday rotator have the same color, discrimination with the naked eye is difficult. In the fabrication of the Faraday rotator, after giving the hard magnetism, a process such as working or washing follows, and it is not easy to continue to discriminate between the front and back in this subsequent process. Thus, JP-A-10-115815 proposes that the hue of an antireflection film formed on the Faraday rotator is made different between the front and back surfaces.

More specifically, after a grown single crystal film is cut and polished, antireflection films having different hues are formed on the front and back surfaces to make a definite form product in which the hues of the front and back are different from each other, and then, the hues of the front and back are used as an index to enable discrimination of the magnetization direction after magnetizing.

However, in the foregoing JP-A-10-115815, when the Faraday rotator is incorporated in the optical device such as the optical isolator, it is necessary to always grasp which hue indicates the front surface or back surface of the single crystal film. Besides, in order to provide coatings having different hues on the front and back surfaces of the single crystal film, the antireflection films must be made to have different structures (kind of medium, or thickness) between the front and back surfaces, and there is a problem in expediency.

Besides, although hard magnetic garnet is not an object, as a method of discriminating the front and back of a Faraday rotator, JP-A-2000-89165 proposes that when magnetic garnet single crystal is cut vertically and horizontally and is worked into a rectangular plate chip, groove working is performed from one surface along one cut line, so that a slit is formed along one side.

Both the proposal of JP-A-10-115815 and the proposal of JP-A-2000-89165 are evaluated in that the front and back surfaces of the Faraday rotator can be discriminated. However, in the proposal of JP-A-10-115815, with respect to the antireflection films provided on the Faraday rotator, although it is originally sufficient if the same is used for the front and back surfaces, to dare to use the antireflection films with the different hues causes such a burden that the design of the antireflection films and the setting of film formation conditions must be made for each of the front and back surfaces. Besides, according to the study of the present inventors, it can be difficult even for a skilled person to recognize the difference according to the hues of the front and back surfaces.

Besides, like the proposal of JP-A-2000-89165, in the Faraday rotator in which the slit is formed along one side by performing the groove working from the one surface along the one cut line, according to the study of the present inventors, it has been confirmed that the characteristics required for the hard magnetic Faraday rotator, especially holding power is lowered.

SUMMARY OF THE INVENTION

An object of the present invention is to provide a manufacturing method of an optical device excellent in expediency and further provides a technique for stably manufacturing a high performance optical device.

Another object of the invention is to provide a expedient method capable of clearly discriminating between the front and back surfaces of a Faraday rotator by using an antireflection film.

Still another object of the invention is to provide a working method capable of discriminating between the front and back surfaces while preventing deterioration of characteristics required for a Faraday rotator.

[First Solving Means]

A Faraday rotator is fabricated by magnetizing a bismuth substitutional rare earth iron garnet single crystal film (hereinafter suitably referred to as "garnet single crystal film" or simply "single crystal film") grown by an LPE method or the like, and by polishing and cutting it to a predetermined thickness. Then, the Faraday rotator fabricated in this way, together with other optical elements, is assembled so that an optical device is fabricated. The present inventor made various studies to obtain a high performance optical device by a simple method, and found that when a magnetizing step is performed after a Faraday rotator is incorporated in an optical device, it becomes unnecessary to discriminate between the front and back surfaces of the single crystal film.

That is, the invention is a manufacturing method of an optical device incorporating a Faraday rotator, and is characterized by comprising a step of obtaining a bismuth substitutional rare earth iron garnet single crystal film constituting the Faraday rotator and capable of exhibiting a substantially rectangular magnetic hysteresis, and a magnetizing step of magnetizing the single crystal film in a state where this single crystal film is incorporated in the optical device.

Here, the optical device widely includes an optical isolator, an optical attenuator, an optical circulator, an optical switch and a waveguide type device of those. Incidentally, although the optical isolator includes a polarization dependence type and a polarization independence type, the optical isolator simply stated in the invention has the concept including both the polarization dependence type and the polarization independence type.

In the manufacturing method of the optical device according to the invention, it is preferable to perform a demagnetizing treatment to the obtained single crystal film before the foregoing magnetizing step. This demagnetizing treatment can be performed in a state where heating of not lower than the Curie temperature of the single crystal film is applied. It is desirable that the single crystal film completely loses the magnetic force by this demagnetizing treatment. However, as a result of the demagnetizing treatment, although there is also a case where slight magnetic force remains, in the specification, a process performed to demagnetize the single crystal film is widely called "demagnetizing treatment". Besides, a case where slight magnetic force remains as a result of the demagnetizing treatment is suitably referred to as "degaussing".

Besides, the invention provides an optical device comprising a Faraday rotator, an optical element other than the Faraday rotator, and a member for fixing the Faraday rotator and having the following feature. That is, the optical device of the invention includes a first optical element on which forward direction light is incident, a second optical element which is disposed a predetermined distance away from the first optical element and is opposite thereto and from which forward direction light emerges, a Faraday rotator disposed between the first optical element and the second optical element and rotating a polarization plane of light transmitted through the first optical element to emit the light to the second optical element, and a member for fixing the Faraday rotator, in which the Faraday rotator is made of a bismuth substitutional rare earth iron garnet single crystal film exhibiting a rectangular magnetic hysteresis and is fixed to the member by a fixing agent having a melting point not lower than a Curie point of the Faraday rotator.

Here, as the first optical element and the second optical element, a polarization separating element such as a polarizer or a rutile can be used. For example, when an optical isolator is manufactured as the optical device, a polarizer has only to be used as the first optical element and the second optical element. Besides, as the fixing agent, solder or low melting point glass is suitable, and by these, the Faraday rotator can be firmly fixed to the member.

Further, the invention provides an optical device which comprises a Faraday rotator, an optical element other than the Faraday rotator, and a member for fixing the Faraday rotator, and is characterized in that the Faraday rotator is made of a bismuth substitutional rare earth iron garnet single crystal film exhibiting a rectangular magnetic hysteresis, and the Faraday rotator is fixed to the member by a fixing agent having a melting point of 200° C. or higher. Incidentally, as the fixing agent having the melting point of 200° C. or higher, there are solder, low melting glass, and the like.

Besides, the invention provide a manufacturing method of a Faraday rotator using a bismuth substitutional rare earth iron garnet single crystal film exhibiting a substantially rectangular magnetic hysteresis, characterized by comprising a step of obtaining a single crystal film, a step of performing a demagnetizing treatment to the obtained single crystal film, a step of performing a predetermined treatment to the single crystal film having subjected to the demagnetizing treatment, and a step of magnetizing the single crystal film having subjected to the predetermined treatment. This demagnetizing treatment is a treatment performed to demagnetize (or degauss) the single crystal film, and as the demagnetizing treatment, heating of the Faraday rotator at the Curie temperature or higher, or alternating current demagnetization can be adopted.

An optical device such as an optical isolator is applied to an optical communication system as well known. The invention proposes applying the optical device of the invention to this optical communication system. This proposal is an optical communication system which comprises an optical transmitter for emitting an optical signal converted from an electric signal, an optical transmission line for transmitting the optical signal emitted from the optical transmitter, and an optical receiver for receiving the optical signal transmitted through the optical transmission line and converting the received optical signal into an electric signal, and is characterized in that the optical transmitter includes an electric-optical conversion element for converting the electric signal into the optical signal, and an optical device disposed between the electric-optical conversion element and the optical transmission line, a Faraday rotator constituting the optical device is made of a bismuth substitutional rare earth iron garnet single crystal film exhibiting a rectangular magnetic hysteresis, and is fixed to a member by a fixing agent having a melting point of not lower than a Curie point of the Faraday rotator.

[Second Solving Means]

The inventor studied a method of discriminating between the front and back surfaces of a Faraday rotator by using an antireflection film, and found that even if a hue is not made different between the front and back surfaces as proposed in JP-A-10-115815, if the shape of the antireflection film is made different between the front and back surfaces by, for example, forming the antireflection film on the whole surface of one of the front and back surfaces similarly to the prior art and providing on the other surface a region where the antireflection film is not formed, the front and back surfaces can be discriminated.

Accordingly, the invention is a Faraday rotator for rotating a polarization plane of incident light, which includes a flat rotator body made of a bismuth substitutional rare earth iron garnet single crystal film and including front and back surfaces opposite to each other, and antireflection films formed on the front and back surfaces of the rotator body, wherein formation shapes of the antireflection films are made different between the front and back surfaces.

In the Faraday rotator of the invention, since the formation shapes of the antireflection films are different between the front and back surfaces, the front and back surfaces can be discriminated at a glance by merely making light impinge on the front and back surfaces. As compared with the case where the hues of the antireflection films on the front and back surfaces are made different, the easiness of discrimination of the front and back surfaces is remarkably improved. The difference of the hues of the antireflection films is, for example, the difference between pale purple and bluish purple, and when consideration is given to the fact that the bismuth substitutional rare earth iron garnet single crystal film constituting the Faraday rotator body is substantially black, the discrimination is not easy.

On the other hand, according to the invention, although the hues are identical to each other, only if light is irradiated, the region where the antireflection film is not formed can be clearly discriminated from the region where the antireflection film is formed. Further, if the surface on the whole of which the antireflection film is formed is determined to be the front surface or the back surface, the front and back of the Faraday rotator can be discriminated also by recognizing the surface on the whole of which the antireflection film is formed.

There are various modes in which the formation shapes of the antireflection films are different between the front and back surfaces. For example, the formation shapes on the front and back surfaces can be made different from each other by not forming the antireflection film at least in the vicinity of one corner of one of the front and back surfaces. The antireflection film can perform its function when it is formed in, for example, a region through which light is transmitted when incorporated in an optical isolator. Conversely speaking, it is not necessary to form the antireflection film in a region other than the light transmission region. In the conventional Faraday rotator, the antireflection film is merely formed on the whole surface in order to avoid the trouble of selectively forming the antireflection film only in the light transmission region.

Then, the invention recommends forming the region in which the antireflection film is not formed, in the vicinity of the corner part which is not the light transmission region.

Besides, a desirable shape is such that the antireflection film is formed on the whole surface of one of the front and back surfaces, while the antireflection film is formed on the other surface only in a predetermined region including a light transmission region of a Faraday rotator.

In the above, although the method of discriminating between the front and back surfaces of the Faraday rotator using the antireflection films has been proposed, as described below the invention also proposes a method of discriminating between the front and back surfaces of the Faraday rotator by performing machining or other working.

As in the proposal of JP-A-2000-89165, the Faraday rotator in which the slit is formed along the one side by performing the groove working along the one cut line from the one surface, causes a drop in holding power and an asymmetrical magnetic hysteresis. On the other hand, by restricting the worked region, the front and back surfaces can be discriminated while the deterioration of characteristics is prevented.

The invention proposes that the worked region is restricted to a region other than the light transmission region, more specifically, to a corner part of the Faraday rotator, and a processing part for discriminating between the front and back surfaces is formed. That is, the invention is a Faraday rotator for rotating a polarization plane of incident light, characterized in that the Faraday rotator includes a flat rotator body made of a bismuth substitutional rare earth iron garnet single crystal film and including front and back surfaces opposite to each other, and a front/back confirmation processing part provided at the corner part of the Faraday rotator.

The front/back confirmation processing part of the invention is such that at least one corner part of the rotator body is chamfered. For example, by chamfering a corner part belonging to one surface of the front surface or the back surface of the rotator body, the front and back surfaces of the rotator body can be discriminated. Although it is sufficient if at least one corner part is chamfered, two to four corner parts may be chamfered.

As the front/back confirmation processing part of the invention, it is also possible to cause all edge parts of the rotator body to be subjected to round working and to provide a difference in the round working between the edge part belonging to the front surface of the rotator body and the edge part belonging to the back surface.

Incidentally, the corner part and the edge part in the invention will be mentioned in the after-mentioned embodiment. Besides, the round working indicates such shape that the worked surface subjected to the chamfering is rounded.

The front/back confirmation processing part of the invention is not limited to the shape in which the mechanical working is performed, and the front/back confirmation processing part can also be constructed by, for example, performing printing on the corner part. Further, a laser irradiation mark obtained by irradiation of a laser beam to the corner part can also be made the front/back confirmation processing part.

Incidentally, it is important that the front/back confirmation processing part is formed in a region other than a light transmission region of the Faraday rotator. This is because in the case where the front/back confirmation processing part exists in the light transmission region, there is a fear that transmission of light in the Faraday rotator is blocked and the characteristics of the Faraday rotator are deteriorated. Besides, the above examples of the front/back confirmation processing part merely enumerate preferable shapes, and all shapes of the invention are not indicated.

DETAILED DESCRIPTION OF THE PREFERRED EMBODIMENTS

First Embodiment of the Invention

Hereinafter, the present invention will be described in more detail and specifically with reference to the drawings.

Figure 1:
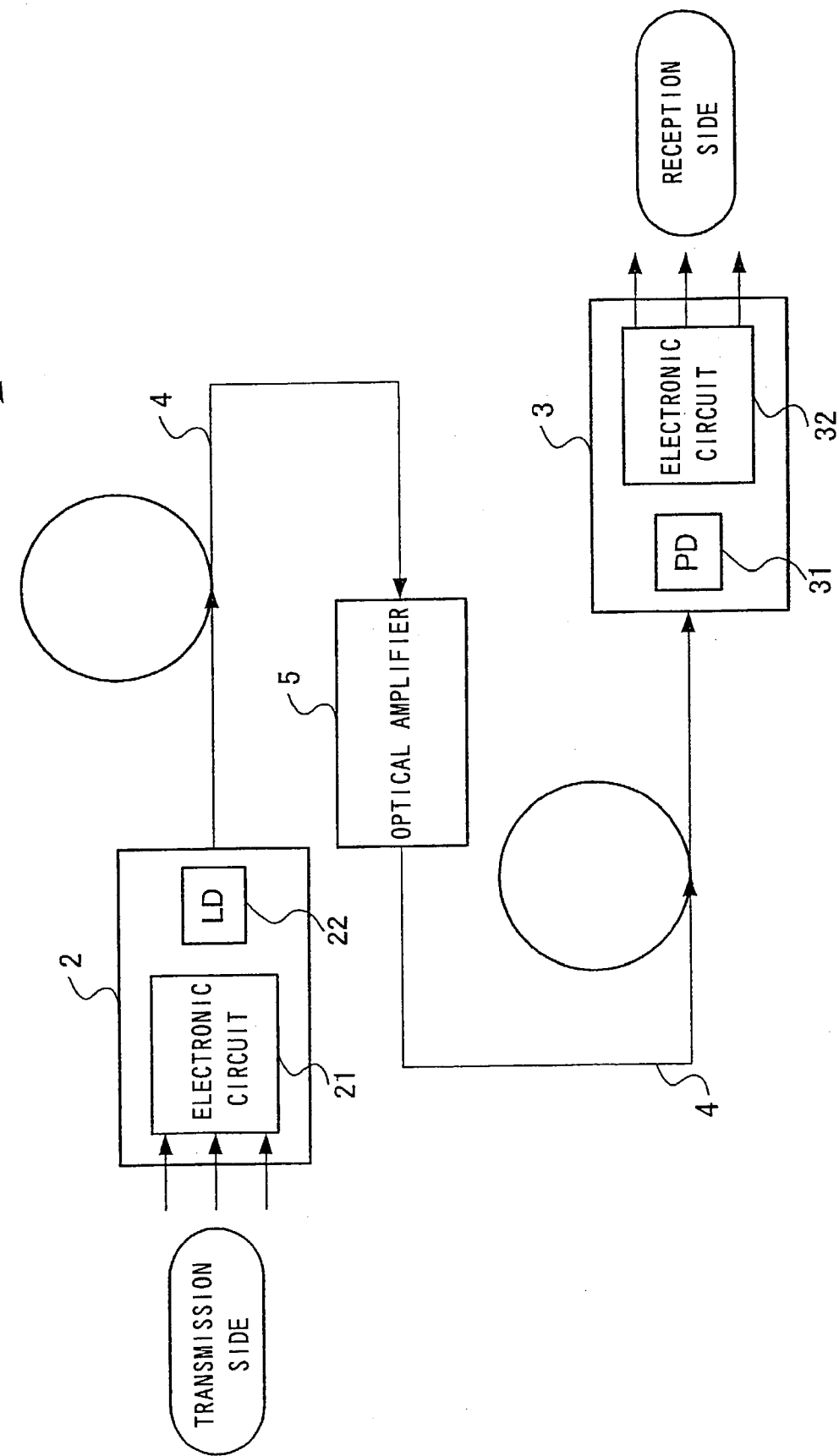
FIG. 1 is a view. showing a structure of an optical communication system according to a first embodiment of the invention.

First, an optical communication system 1 to which the invention is applied will be described by use of FIG. 1.

The optical communication system 1 is a system for transmitting information by an optical signal between a transmission side and a reception side. An optical transmitter 2 is provided in the transmission side, and an optical receiver 3 is provided in the reception side. The optical transmitter 2 and the optical receiver 3 are connected through an optical transmission line 4 made of an optical fiber. Optical amplifiers 5 intervene on the optical transmission line 4. The number of the optical amplifiers 5 corresponds to the length of the optical transmission line 4.

The optical transmitter 2 includes an electronic circuit 21 and an LD module 22. The electronic circuit 21 receives data of an object of transmission as an electric signal and performs a predetermined processing, and then, outputs it to the LD module 22. The LD module 22 converts the received electric signal into an optical signal, and then, transmits it to the optical transmission line 4.

The optical receiver 3 includes a PD module 31 and an electronic circuit 32. The PD module 31 receives the optical signal transmitted from the optical transmission line 4, and converts it into an electric signal and outputs it to the electronic circuit 32. The electronic circuit 32 outputs the received electric signal to the reception side.

The optical amplifier 5 disposed on the optical transmission line 4 amplifies the optical signal transmitted through the optical transmission line 4 to prevent attenuation thereof.

Figure 2:
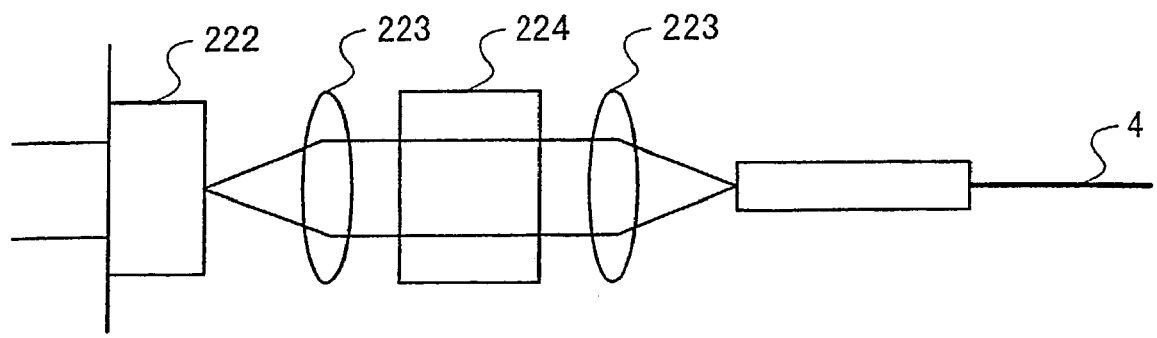
FIG. 2 is a perspective view showing a structure of an LD module according to the first embodiment of the invention.

FIG. 2 is a view showing a structure of the LD module 22. The LD module 22 includes an LD 222 disposed in a case, a lens 223 through which light (signal) outputted from the LD 222 is transmitted, and an optical isolator 224 for rotating the polarization plane of light (signal) transmitted through the lens 223.

Figure 3:
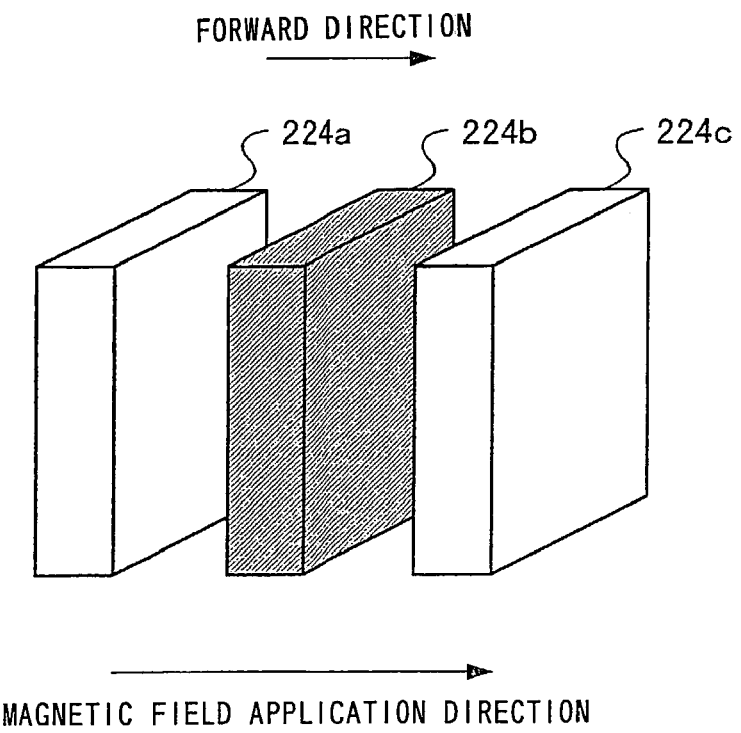
FIG. 3 is a view showing a structure of an optical isolator according to the first embodiment of the invention.

FIG. 3 is a view showing a structure of the optical isolator 224. As shown in FIG. 3, the optical isolator 224 has the structure in which a Faraday rotator 224b is disposed between two polarizers 224a and 224c. The two polarizers 224a and 224c are a predetermined distance away from each other and are disposed to be opposite to each other. Now, when light in the forward direction is incident on the polarizer 224a, the light in the forward direction is emitted from the polarizer 224c to the optical transmission line 4.

A well-known material can be used for the polarizers 224a and 224c. For example, although Polar Cor (trade mark) of Corning Inc. is desirable, it is not limited to this.

The Faraday rotator 224b rotates the polarization plane of the forward direction light transmitted through the polarizer 224a by, for example, 45 deg., and emits it to the polarizer 224c. The polarizing axis of the polarizer 224c is disposed to be rotated by 45 deg. with respect to the polarizing axis of the polarizer 224a. Thus, the polarizer 224c allows the forward direction light to be transmitted through. On the other hand, the polarization plane of the reverse direction light incident from the side of the polarizer 224c and transmitted through the polarizer 224c is further rotated by the Faraday rotator 224b by 45 deg., and intersects the polarizing axis of the polarizer 224a at right angles. By this, the optical isolator 224 allows the forward direction light from the side of the polarizer 224a to be transmitted through, and blocks the transmission of the reverse direction light from the side of the polarizer 224c.

In this embodiment, this Faraday rotator 224b is made of a bismuth substitutional rare earth iron garnet single crystal film. This Faraday rotator 224b functions as a part of an optical device such as the optical isolator 224.

Hereinafter, a manufacturing method of an optical device according this embodiment will be described by use of FIG. 4. As described above, this embodiment is characterized in that after the Faraday rotator 224b made of the single crystal film is incorporated in the optical device such as the optical isolator 224, magnetizing is performed. Hereinafter, the manufacturing method of the optical device according to this embodiment will be described in detail.

Figure 4:
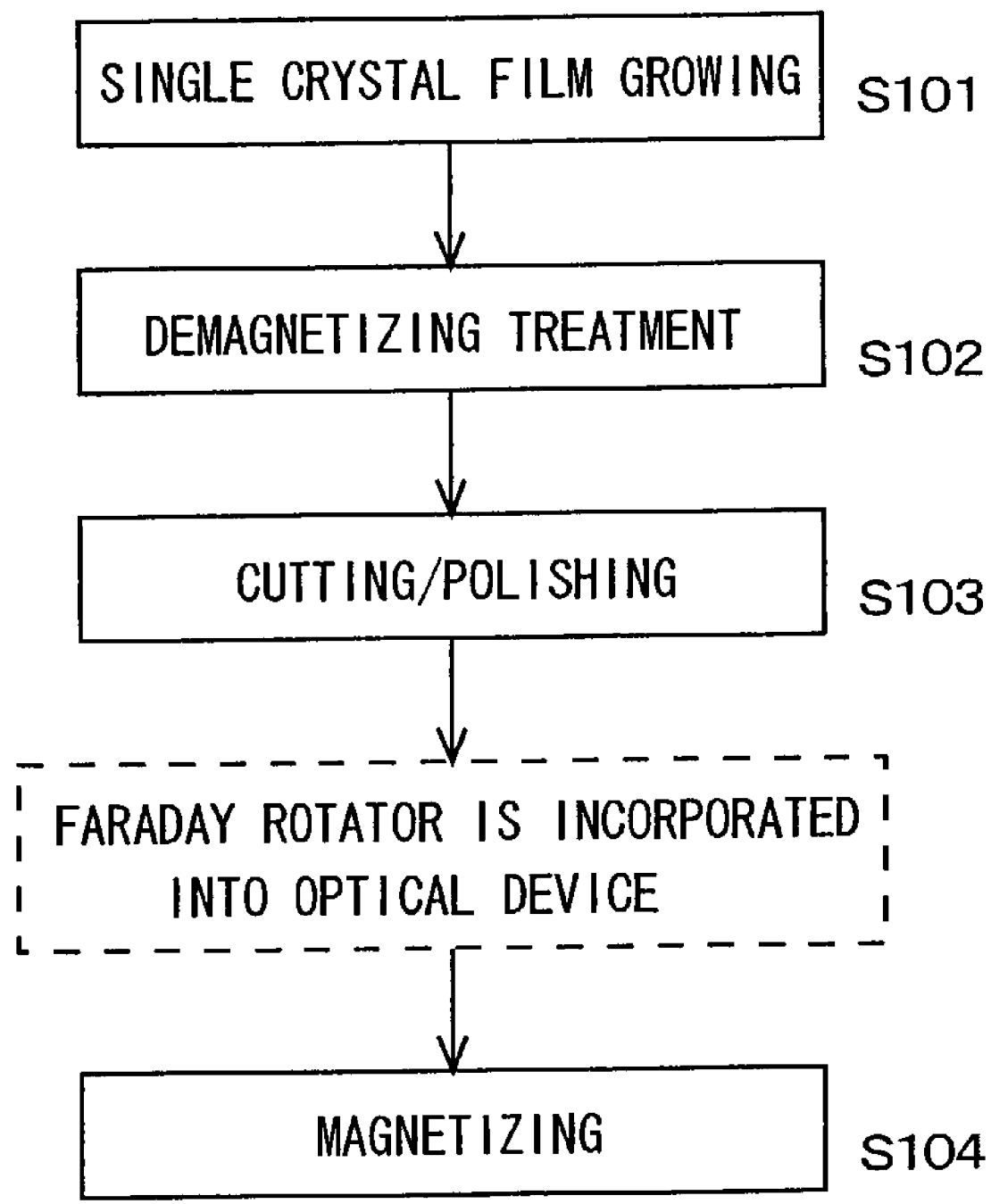
FIG. 4 is a flowchart showing a manufacturing process of an optical isolator according to the first embodiment of the invention.

As shown in FIG. 4, this embodiment includes a single crystal film growing step (step S101), a demagnetizing treatment step (step S102), a cutting/polishing step (step S103), and a magnetizing step (step S104).

Hereinafter, a preferable composition of the single crystal film will be mentioned, and then, the respective steps will be described.

<Composition of the Single Crystal Film>

The composition of the single crystal film is a hard magnetic material, that is, selected so that the Faraday rotator 224b exhibits a rectangular magnetic hysteresis after an after-mentioned magnetizing step (step S104).

It is desirable that the composition of the bismuth substitutional rare earth iron garnet single crystal film is made a chemical composition of $(Bi_{3-x}-R_x)Fe_{(5-w)}M_wO_{12}$ (where, R is one or not less than two kinds of rare earth elements including Y, M is one or not less than two kinds of elements of Ga, Al, Ge, Sc, In, Si and Ti). Here, R is one or not less than two kinds of rare earth elements (La, Ce, Pr, Nd, Sm, Eu, Gd, Tb, Dy, Ho, Er, Yb and Lu) including Y. Hereinafter, a rare earth element including Y is referred to as a "rare earth element R".

Besides, in the hard magnetic garnet material of this embodiment, it is desirable to meet the condition of $0.5 \leq x \leq 2.5$ and $0.2 \leq w \leq 2.5$, and further the condition of $1.0 \leq x \leq 2.3$ and $0.4 \leq w \leq 1.5$.

Gd, Tb or Yb is especially preferable as the rare earth element R. Since the magnetic moment of Gd is largest among the rare earth elements, it is effective in reducing saturation magnetization (4 πMs). Besides, since the magnetization reversal temperature of GdBi series garnet is about −10° C. and is close to room temperature as compared with −50° C. of TbBi series garnet, it is advantageous in hard magnetization. Further, since Gd does not absorb light of a wavelength of 1.2 μm or higher, it is advantageous in insertion loss.

Tb is an effective element for ensuring temperature characteristics and wavelength characteristics. Although Gd has high magnetic anisotropy and is an effective element in obtaining high holding power, Tb has a greater contribution to the holding power.

From the above reason, in the bismuth substitutional rare earth iron garnet single crystal film of this embodiment, it is especially desirable that the composition is made the chemical composition of $(Bi_{3-a-b-c}Gd_aTb_bYb_c)Fe_{(5-w)}M_wO_{12}$ (where, M is one or not less than two kinds of elements of Ga, Al, Ge, Sc, In, Si and Ti, $0.5 \leq a+b+c < 2.5$, $0.2 \leq w \leq 2.5$).

Although it is premised that the bismuth substitutional rare earth iron garnet single crystal film of this embodiment is formed by the LPE method, Yb is contained to match the lattice constant of the single crystal film with the lattice constant of a substrate. In order to increase the Faraday rotational capacity, it is desired to form crystal containing a large amount of Bi. Here, the Faraday rotation angle is proportional to the thickness of a material constituting the Faraday rotator 224b, and the rotation angle per unit thickness is called the Faraday rotational capacity. Besides, since the rotation angle of the Faraday rotator 224b used for the optical isolator 224 is 45°, as the Faraday rotational capacity becomes large, the thickness of the Faraday rotator 224b can be made thin, and this is advantageous to miniaturization.

Besides, the substrate used for the LPE method (hereinafter referred to as the LPE substrate) has a predetermined lattice constant. Since Bi has a large ion radius, if the amount of Bi is simply made large, matching between the lattice constant of the crystal film to be obtained and the lattice constant of the substrate can not be obtained. Then, the amount of Bi is made large, and Yb having a small ion radius is made to be contained, so that matching between the lattice constant of the crystal film to be obtained and the lattice constant of the substrate is obtained. Since Yb has no optical absorption in the wavelength range of light used for the optical communication, insertion loss is not deteriorated.

In the bismuth substitutional rare earth iron garnet material of this embodiment, M is an element which substitutes a part of Fe, and is selected from one or not less than two kinds of elements of Ga, Al, Ge, Sc, In, Si and Ti. Among these, Ga is the most desirable element in view of the stability of single crystal film growth or influence on easiness.

In the bismuth substitutional rare earth iron garnet material of this embodiment, a, b and c denoting the content of Gd, Tb and Yb are made $0.5 \leq a+b+c \leq 2.5$. When a+b+c becomes less than 0.5, the amount of Bi having a large ion radius becomes relatively large, and matching of the lattice constant to the LPE substrate for growth of the single crystal film by the LEP method can not be attained. On the other hand, when a+b+c exceeds 2.5, the amount of Bi becomes relatively small, and the Faraday rotational capacity becomes low. As a result, the thickness of the single crystal film must be made thick, the growth of the single crystal film by the LPE method becomes difficult, and the yield becomes low. The desirable range of a+b+c is $1.0 \leq a+b+c \leq 2.3$.

Further, it is desirable that a, b and c are respectively made $0.1 \leq a \leq 1.5$, $0.3 \leq b \leq 2.0$, and $0.1 \leq c \leq 1.5$. The value of a (amount of Gd) is made not less than 0.1 in order to sufficiently ensure magnetic anisotropy for obtaining hard magnetism. On the other hand, if a exceeds 1.5, since the amount of Tb and Bi becomes insufficient, high Faraday rotational capacity can not be obtained.

The value of b (amount of Tb) is made not less than 0.3 in order to sufficiently ensure magnetic anisotropy for obtaining hard magnetism. On the other hand, if b exceeds 2.0, insertion loss in the light of a wavelength exceeding 1.5 μm becomes large.

The value of c (amount of Yb) is made not less than 0.1 because if c is less than 0.1, sufficient Faraday rotational capacity can not be ensured, and it becomes necessary to increase the film thickness. On the other hand, if c exceeds 1.5, the amount of Gd, Tb and Bi become insufficient and high Faraday rotational capacity can not be ensured.

In the bismuth substitutional rare earth iron garnet material of this embodiment, w as the substitute amount of M with respect to Fe is made $0.2 \leq w \leq 2.5$. If w is less than 0.2, the obtained single crystal film can not keep a rectangular magnetic hysteresis. On the other hand, when w exceeds 2.5, an unnecessary crystal nucleus is created in a molten portion during the growth of the single crystal film, and it becomes difficult to make stable growth of the single crystal film. A desirable range of w is $0.3 \leq w \leq 2.0$, and a more desirable range of w is $0.4 \leq w \leq 1.5$.

However, as described above, the embodiment is characterized in that after the Faraday rotator 224b made of the hard magnetic bismuth substitutional rare earth iron garnet single crystal film is incorporated in the optical device such as the optical isolator 224, magnetizing is performed, and the composition of this single crystal film is not particularly limited to the above, and may be suitably adjusted so that the single crystal film exhibits the hard magnetism.

The Faraday rotator 224b according to this embodiment can be constituted by the single crystal film of the above described bismuth substitutional rare earth iron garnet material grown by, for example, the LPE method. This single crystal film exhibits the substantially rectangular magnetic hysteresis.

<Single Crystal Film Growth Step>

Next, the single crystal film growth step (step S101) will be described.

Figure 5:
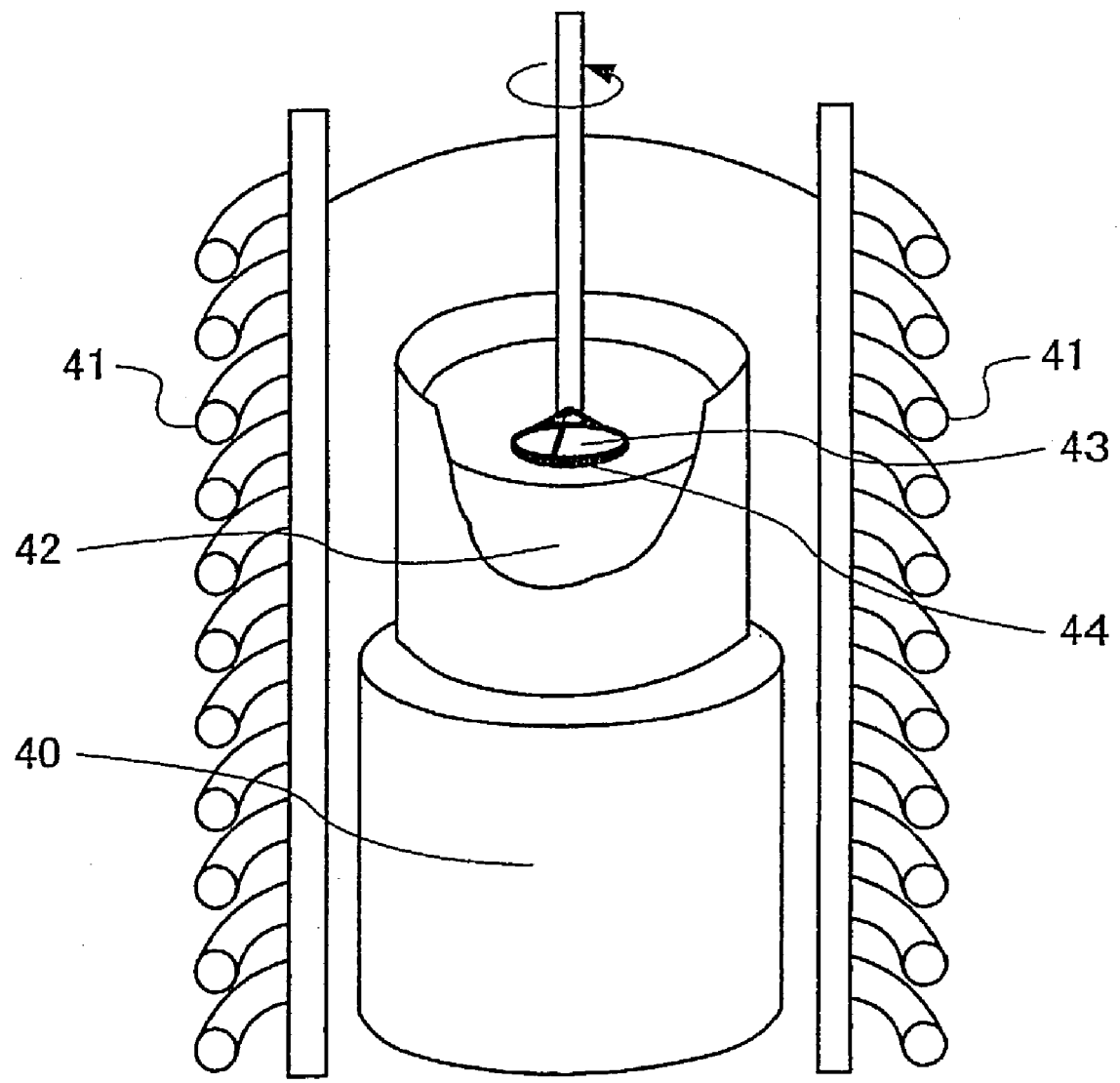
FIG. 5 is a view for explaining an LPE method.

The single crystal film according to this embodiment can be grown by the LPE method. FIG. 5 shows a state in which the single crystal film is grown by the LPE method.

As shown in FIG. 5, for example, raw material of the single crystal film to be obtained and flux are put in a crucible 40 made of, for example, platinum. The raw material and the flux put in the crucible 40 are heated and melted by current application to a heating coil 41 to form a melt 42. When the temperature of the melt 42 is lowered to put it into a supercooled state, and an LPE substrate is brought into contact with the melt while it is rotated, a single crystal film 44 epitaxially grows on the LPE substrate 43. Incidentally, although impurities are inevitably mixed into the grown single crystal film 44 from the flux and the crucible 40, it is needless to say that this embodiment allows such inevitable mixture of impurities. Of course, in order to make the effect of this embodiment practical, it is desirable to decrease the mixture of the impurities.

The single crystal film 44 obtained by the LPE method is grown to be slightly thicker than the thickness of the Faraday rotator 224b to be finally obtained. This is because it is used for the Faraday rotator 224b after polishing.

<Demagnetizing Treatment Step>

After the single crystal film 44 is grown by the single crystal film growing step (step S101), the step proceeds to the demagnetizing treatment step (step S102). The demagnetizing treatment step (step S102) is a step performed to remove magnetic force of the single crystal film 44, that is, to demagnetize (or degauss) the single crystal film 44. The reason why this embodiment includes the demagnetizing treatment step (step S102) is as follows. That is, the single crystal film 44 grown by the single crystal film growing step (step S101) has a certain degree of magnetic force. When a predetermined treatment such as cutting/polishing or antireflection coating is applied to the single crystal film 44 having the magnetic force, metal dust of iron or the like, a metal tool, and the like are attached to the surface of the single crystal film 44 by this magnetic force.

To cut and polish the single crystal film 44 in the state where such dust is attached has a problem in operation efficiency and working accuracy, and in the case where the single crystal film 44 in the state where such dust is attached is incorporated into the optical device such as the optical isolator 224, the characteristics of the optical device can deteriorate. Thus, it is preferable to perform the demagnetizing treatment step (step S102) before the cutting/polishing step (step S103).

As the demagnetizing treatment to the single crystal film 44, for example, heating, alternating current demagnetizing or combination of these can be cited. In the case where the single crystal film 44 is demagnetized (or degaussed) by the heating, the heating temperature is made a temperature not lower than the Curie point of the single crystal film 44. As is well known, when a magnetic material is exposed to high temperature not lower than the Curie point, magnetic force completely disappears. Here, although the Curie point of the single crystal film 44 varies according to the composition, it is about 180° C. to 200° C.

Specifically, in the bismuth substitutional rare earth iron garnet single crystal film, the Curie point of the single crystal film 44 in the case where Fe is not substituted by Ga or Al is about 280° C., and the Curie point of the single crystal film 44 in the case where Fe is substituted by Ga or Al is about 190° C. to 200° C. Thus, in the embodiment, the temperature not lower than the Curie point of the single crystal film 44 specifically means the temperature not lower than 180° C.

In the case where the single crystal film 44 is demagnetized (or degaussed) by the AC demagnetization, it is sufficient if a sufficiently intense AC magnetic field is made to act in a place where static magnetic field hardly exists, and the amplitude is gradually decreased to zero.

<Cutting and Polishing Step>

After the demagnetization (or degaussing) is performed in the demagnetizing treatment step (step S102) of the single crystal film 44, the step proceeds to the cutting/polishing step (S103). In the cutting/polishing step (step S103), the single crystal film 44 is cut and polished into a predetermined size, so that the Faraday rotator 224b is obtained.

It is preferable that cutting of the single crystal film 44 is performed by using a wire saw. According to the cutting using the wire saw, chipping at the time of the cutting can be suppressed to the minimum. As stated above, by suppressing the chipping, while the state close to the complete crystal grown in the single crystal film growing step (step S101) is kept, the single crystal film 44 excellent in the magnetic characteristics can be obtained. Here, the chipping is a phenomenon in which the edge of a cut surface of the single crystal film 44 is broken at the time of cutting the single crystal film 44.

Besides, in the Faraday rotator 224b, the single crystal film 44 is used in which the rotation angle becomes 45° with respect to the wavelength of light used. In other words, the single crystal film 44 grown by the LPE method is polished till the Faraday rotation angle becomes 45°. The Faraday rotator 224b has a thickness of about 500 μm.

It is desired that in order to reduce insertion loss, after cutting and polishing are performed, antireflection coating is applied to the surface of the Faraday rotator 224b. Here, the insertion loss is the attenuation portion of outgoing light with respect to the incident light. The insertion loss in the Faraday rotator 224b includes an optical absorption loss of a material constituting the Faraday rotator 224b, and a reflection loss of an interface due to a difference of a refractive index between the material and the air. In order to ensure high quality information transmission, it is required to reduce the insertion loss in the Faraday rotator 224b, and by applying the antireflection coating to the surface of the Faraday rotator 224b, the reflection loss can be reduced to such a degree that it can be neglected.

<Magnetizing Step>

After the Faraday rotator 224b with a predetermined size is obtained by the cutting/polishing step (step S103), the step proceeds to the magnetizing step (step S104). In this magnetizing step (step S104), an external magnetic field is applied to the Faraday rotator 224b made of the single crystal film 44. This magnetizing step (step S104) is a characteristic portion of this embodiment, and the magnetization is performed in the state where the Faraday rotator 224b is incorporated in the optical device such as the optical isolator 224. Thus, when the Faraday rotator 224b is incorporated in the optical device such as the optical isolator 224, it is not necessary to discriminate between the front and back surfaces of the Faraday rotator 224b.

The intensity of the external magnetic field in the magnetizing step (step S104) is made not lower than the saturation magnetic field, specifically, in the case of the Faraday rotator 224b of the foregoing composition, not lower than 500 Oe. As the intensity of the external magnetic field becomes high within the range of several times as high as the holding power Hc at the maximum, the improvement in the holding power of the Faraday rotator 224b can be expected. However, in order to prevent an increase in cost of the device, at present, the upper limit of the intensity of the external magnetic field is made about 20 kOe. More desirable intensity of the external magnetic field is 1 kOe or higher, and further desirable intensity of the external magnetic field is 2 koe or higher.

A time in which the external magnetic field is applied may be made about 1 minute to 1 hour. However, this time is influenced by the intensity of the external magnetic field, and in the case where the intensity of the external magnetic field is high, specifically, in the case where the intensity of the external magnetic field is 2 kOe or higher, even if the time when the external magnetic field is applied is several seconds, the effect of achievement of high holding power can be obtained.

Besides, as described above, in this embodiment, the magnetization is performed in the state where the Faraday rotator 224b is incorporated in the optical isolator 224. Here, a state where the Faraday rotator 224b is magnetized will be shown by use of FIG. 6.

Figure 6:
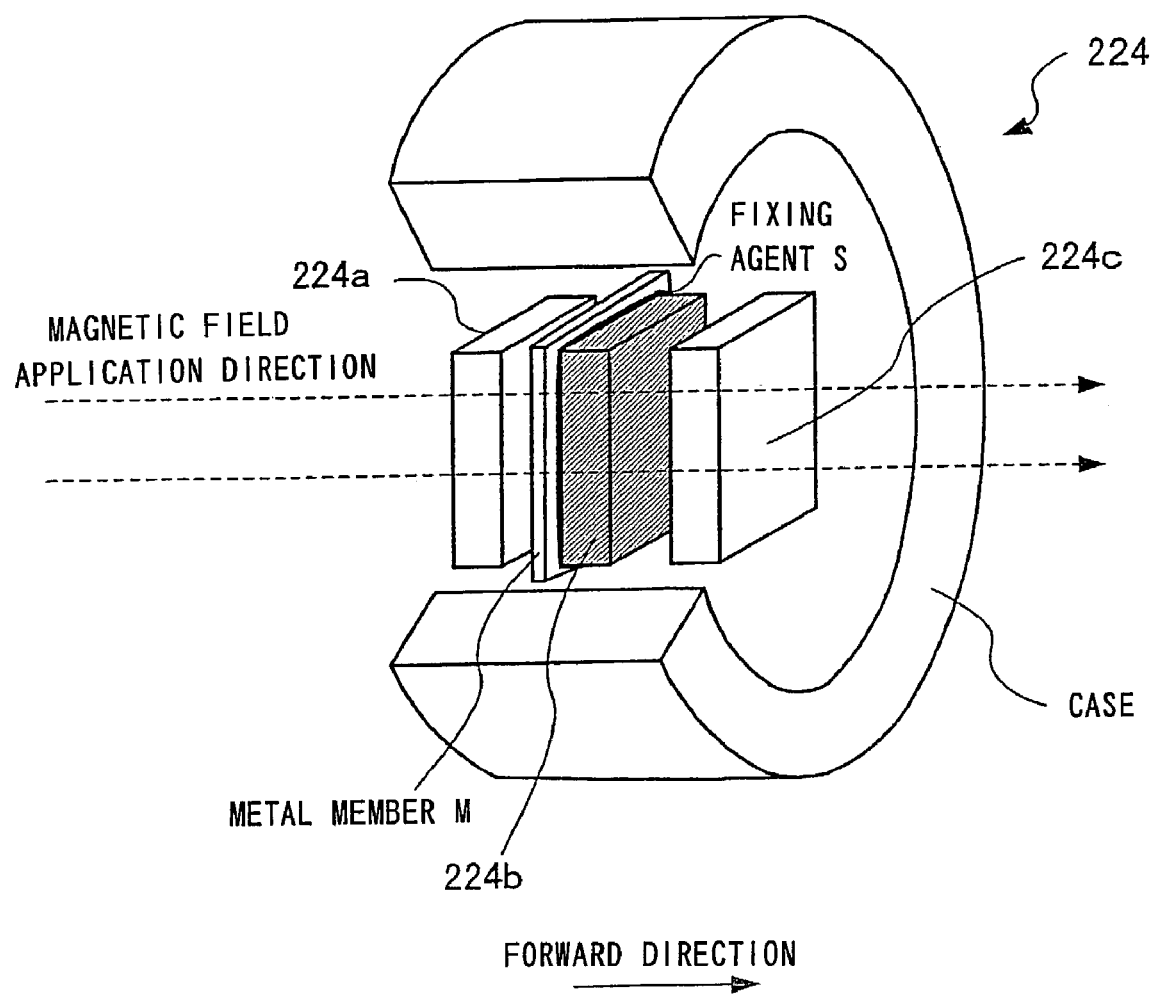
FIG. 6 is a view showing a state in which magnetizing is performed in a state where a Faraday rotator is incorporated in an optical isolator.

As shown in FIG. 6, the Faraday rotator 224b is normally incorporated in the optical isolator 224 in a state where it is fixed to a metal member M by a fixing agent S. Then, in the state where the Faraday rotator 224b is incorporated in the optical device such as the optical isolator 224, a magnetic field not lower than the saturation magnetic field is applied to the Faraday rotator 224b.

In order to apply the magnetic field not lower than the saturation magnetic field to the Faraday rotator 224b, for example, a magnetic field generating apparatus (not shown) such as an electromagnet can be used. That is, in the state where the Faraday rotator 224b is incorporated in the optical device such as the optical isolator 224, this optical device is installed in the magnetic field generating apparatus such as the electromagnet, and the magnetic field not lower than the saturation magnetic field is applied to the Faraday rotator 224b. The application direction of the magnetic field is made the direction in which the Faraday rotator 224b is finally magnetized, and specifically, the magnetic field is applied in the thickness direction of the Faraday rotator 224b. As shown in FIG. 6, although the Faraday rotator 224b is disposed between the polarizers 224a and 224c, the magnetic field is applied in the thickness direction of the Faraday rotator 224b so that it becomes substantially parallel to the direction in which light travels, that is, the light in the forward direction.

In the metal member M to which the Faraday rotator 224b is fixed, a holding hole for insertion and holding of the Faraday rotator 224b is formed to coincide with the shape of the Faraday rotator 224b. As the fixing agent S, a resin having a melting point not higher than the temperature of the Curie point of the Faraday rotator 224b, specifically, lower than 180° C. is conventionally used. This is because a step of incorporating the Faraday rotator 224b into the optical isolator 224 after the magnetizing step is conventionally adopted. That is, when heat not lower than the Curie point of the Faraday rotator 224b is applied to the Faraday rotator 224b after the magnetizing step, the magnetic force disappears and the meaning of the magnetization is lost. Thus, the Faraday rotator 224b is fixed to the metal member M by the resin having the melting point of not higher than the Curie point.

However, in the case where a resin or the like is made the fixing agent S, the adhesive strength is low, and the reliability of the optical isolator 224 becomes insufficient. Then, on the basis of an idea quite different from the prior art, this embodiment proposes using the fixing agent S having the melting point of a temperature of not lower than the Curie point of the Faraday rotator 224b, specifically, not lower than 180° C. or not lower than 200° C. As described above, in this embodiment, the magnetization is performed after the Faraday rotator 224b is incorporated in the optical isolator 224. Thus, a problem in characteristics does not arise even if the Faraday rotator 224b is heated at a temperature not lower than the Curie point thereof before the magnetizing step (step S104).

As the fixing agent S having the melting point not lower than the Curie point of the Faraday rotator 224b, various ones exist, and especially, solder and low melting point glass are preferable as the fixing agent S. The solder and low melting point glass have high adhesive strength as compared with resin, and have merits as described below. That is, in the case where the solder or low melting point glass is made the fixing agent S, even if it is heated up to a temperature not lower than the melting point, a volatile component to corrode the metal member M to which the Faraday rotator 224b is fixed is not generated. Thus, in the case where the solder or low melting point glass is used as the fixing agent S, it becomes possible to fix the Faraday rotator 224b to the metal member M without corroding the metal member M and firmly.

There are various kinds of solders such as gold tin (Au—Sn) solder, and in the case where the gold tin (Au—Sn) solder is used, the composition is made Au: 60 to 90 wt %, Sn: 10 to 40 wt %. Although the melting point of the gold tin (Au—Sn) solder is 200° C. to 300° C., this value varies according to the composition.

As the low melting point glass, for example, lead-boric acid glass or silver-phosphoric acid glass can be used. Although the melting point of the lead-boric acid glass and the silver-phosphoric acid glass is 350° C. to 500° C., this value also varies according to the composition.

The optical isolator 224 in which the Faraday rotator 224b of this embodiment having the above composition and according to the manufacturing method is incorporated, exhibits excellent characteristics, specifically, a low insertion loss and a high optical extinction ratio.

Incidentally, although the process for manufacturing the optical isolator 224 has been described by use of FIG. 4, the demagnetizing treatment step (step S102) may be again performed after the cutting/polishing step (step S103) and before the magnetizing step (step S104). In this case, it is possible to more effectively prevent cut pieces, which can be produced by the cutting/polishing step (step S103), from attaching to the single crystal film 44. Besides, the demagnetizing treatment step (step S102) is omitted, and before the magnetizing step (step S104), heating at the time when the Faraday rotator 224b is fixed to the metal member M by the fixing agent S may be used also to perform demagnetization (or degaussing). In this case, a heating time required for fixing the Faraday rotator 224b to the metal member M by the fixing agent S such as the solder has only to be set to be longer than usual.

Hereinafter, specific examples of the embodiment will be described.

EXAMPLE 1-1

An experiment performed to confirm the characteristics of the optical isolator 224 in the case where the Faraday rotator 224b is magnetized after it is incorporated in the optical isolator 224 on the basis of the process shown in FIG. 4, will be described as example 1-1.

Bismuth oxide ($Bi_2O_3$, 4N), ferric oxide ($Fe_2O_3$, 4N), gadolinium oxide ($Gd_2O_3$, 5N), terbium oxide ($Tb_4O_7$, 3N), ytterbium oxide ($Yb_2O_3$, 4N), and gallium oxide ($Ga_2O_3$, 4N) were used as raw materials, and the apparatus shown in FIG. 5 was used to grow, by epitaxial growth, one kind of bismuth substitutional rare earth iron garnet single crystal film. An LPE substrate used is made of (111) garnet single crystal ($(GdCa)_3(GaMgZr)_5O_{12}$). The lattice constant of this substrate is 1.2497±0.0002 nm. Incidentally, the raw materials are selected so that the single crystal film 44 exhibits the hard magnetism after it is magnetized. In addition to the above raw materials, lead oxide (PbO, 4N) and boron oxide ($B_2O_3$, 5N) were put as flux into the crucible 40 made of platinum.

After the bismuth substitutional rare earth iron garnet single crystal film was grown, composition analysis of the obtained single crystal film 44 was performed, and the result was $Bi_{1.0}Gd_{0.44}Tb_{1.2}Yb_{0.4}Fe_{4.0}Ga_{1.0}O_{12}$. Besides, the Curie temperature of this single crystal film 44 was 190° C. Next, the thus obtained single crystal film 44 was heated in an elevated temperature furnace up to 430° C., that is, a temperature not lower than the Curie temperature of the single crystal film 44 to perform the demagnetizing treatment, and the demagnetized single crystal film 44 was cut and polished into a predetermined thickness and size. Incidentally, the size of the Faraday rotator 224b after cutting and polishing is 1.0 mm long by 1.0 broad, and 500 μm in thickness.

After antireflection coating was applied to the Faraday rotator 224b, together with the polarizers 224a and 224c, it was assembled as the optical isolator 224. The thus assembled optical isolator 224 was placed in a magnetic field generator, and was magnetized in a desired direction in an external magnetic field of 10 kOe. Next, when the characteristics of the optical isolator 224 was measured, the insertion loss was 0.15 dB, and the optical extinction ratio was 35 dB. Besides, the product yield was 100%.

COMPARATIVE EXAMPLE 1-1

After the single crystal film 44 grown by the same method as the example 1-1was magnetized in an external magnetic field of 10 kOe, cutting, polishing, and antireflection coating were performed to form a Faraday rotator. The Faraday rotator, together with the polarizers 224a and 224c, was assembled as the optical isolator. When the characteristics of this optical isolator were measured, the insertion loss was 1.3 dB, and the optical extinction ratio was 17 dB, which were insufficient values for the optical isolator. Besides, the product yield was 80%.

As a result of a study of the cause of the insufficient characteristics as stated above, it was confirmed that minute dust was attached to an optical path surface of the Faraday rotator in the optical isolator. It is conceivable that this dust was attached when the optical isolator was assembled.

From the results of the above example 1-1 and the comparative example 1-1, it has been found that the optical isolator 224 having the low insertion loss and the excellent optical extinction ratio can be obtained by magnetizing the Faraday rotator 224b after it is incorporated in the optical isolator 224. Besides, it has been found that by magnetizing the Faraday rotator 224b after it is incorporated in the optical isolator 224, the Faraday rotator can be incorporated in the optical isolator 224 without paying attention to the front and back surfaces of the Faraday rotator 224b, so that the operation efficiency is greatly improved, and as compared with the case where the magnetization is performed before it is incorporated in the optical isolator 224, the yield is greatly improved.

EXAMPLE 1-2

An example performed for confirming the product yield of the case where after the Faraday rotator 224b is fixed to the metal member (stainless member) by using a fixing agent, it is incorporated in the optical isolator 224, and thereafter, it is magnetized, will be described as example 1-2.

The Faraday rotator 224b obtained in the example 1-1 (which was obtained in such a manner that after the single crystal film 44 was grown, heating was performed at a temperature not lower than the Curie temperature to perform the demagnetizing treatment, cutting and polishing were performed to obtain a predetermined thickness and size, and antireflection coating was applied) was fixed to a stainless member by using the following fixing agent, and the Faraday rotator, together with the polarizers 224a and 224c, was assembled as the optical isolator 224. Hereinafter, the optical isolator using gold tin solder is called sample 1, and one using lead-boric acid glass is called sample 2.

(Fixing agent)

Gold tin solder (Au/Sn=80/20): melting point of about 250° C.

lead-boric acid glass: melting point of about 430° C.

When the insertion loss and optical extinction ratio of the sample 1 and the sample 2 were measured, the same characteristics as the example 1-1 were obtained. Besides, the product yield was 100% which was an ideal value.

As described above, by magnetizing the Faraday rotator 224b after it is assembled into the optical isolator 224 as recommended by the embodiment, the high performance optical isolator 224 having the low insertion loss and the excellent optical extinction ratio can be obtained. Besides, by using the solder or low melting glass having the melting point not lower than the Curie temperature of the Faraday rotator 224b as the fixing agent S, the adhesive strength between the Faraday rotator 224b and the metal member M is raised, and consequently, the reliability of the optical isolator 224 is improved. Further, by magnetizing the Faraday rotator 224b after it is incorporated in the optical isolator 224, it can be incorporated in the optical isolator 224 without paying attention to the front and back surfaces of the Faraday rotator 224b, and therefore, the operation efficiency is greatly improved and the yield is improved.

Incidentally, in the above examples 1-1 and 1-2, although the description has been given of the case where the optical isolator 224 is assembled by using the Faraday rotator 224b and the polarizers 224a and 224c, in addition to the glass polarizers, also in the case where the optical device is fabricated by using an optical element such as glass, birefringent plate glass, or metal thin film mirror in which metal is evaporated on glass, and the Faraday rotator 224b, the same effect can be expected.

Second Embodiment of the Invention

Hereinafter, a second embodiment of the invention will be described in more detail and specifically with reference to the drawings. The main use of the Faraday rotator of this embodiment includes an optical communication system as described above. Now, as shown in FIG. 6, in the Faraday rotator 224b, a surface perpendicular to the transmission direction of light has a rectangular shape, and the transmitting light in the range of the rectangular shape is generally circular. Accordingly, all portions of the Faraday rotator 224b are not used for performing the function, and it can be said that a portion other than a portion corresponding to the region through which light is transmitted does not function as the Faraday rotator 224b.

In this embodiment, this Faraday rotator 224b is made of a bismuth substitutional rare earth iron garnet single crystal film exhibiting a rectangular magnetic hysteresis. The composition of the bismuth substitutional rare earth iron garnet single crystal film is made identical to that shown in the first embodiment, so that bismuth substitutional rare earth iron garnet material can be obtained which exhibits the Faraday effect in the temperature range of −20° C. to +80° C., that is, in the temperature range where the operation warranty of the optical isolator 224 is needed, and has a Faraday rotational capacity of 700°/cm or higher. In this garnet material, after an external magnetic field not less than the saturation magnetization is applied, even when the external magnetic field is removed, the above Faraday rotational capacity is substantially maintained.

Incidentally, although it is desirable that this embodiment is applied to a hard magnetic bismuth substitutional rare earth iron garnet single crystal film, application to a soft magnetic bismuth substitutional rare earth iron garnet single crystal film is not excluded. For example, like a polarization scrambler or an optical attenuator, there is also a use in which even in the case where the soft magnetic bismuth substitutional rare earth iron garnet single crystal film is used, the front and back surfaces are required to be discriminated.

Next, the Faraday rotator 224b will be described in more detail.

In the Faraday rotator 224b of this embodiment, formation shapes of the antireflection films are different between the front and back surfaces. As one shape, the Faraday rotator 224b in which the antireflection film is not formed at least in the vicinity of one corner part on one of the front and back surfaces can be mentioned.

Figure 7A:
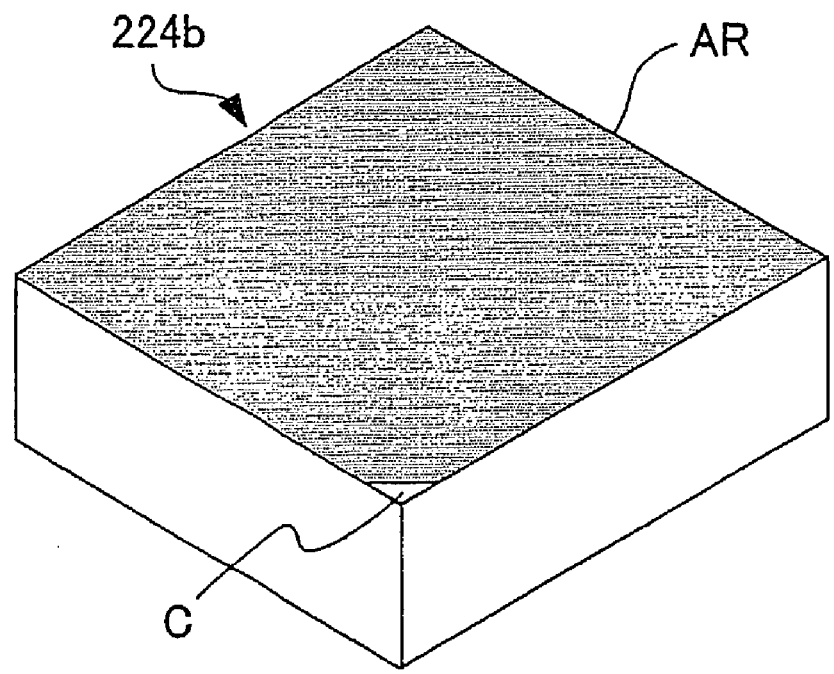
FIGS. 7A and 7B are views showing a Faraday rotator according to example 2-1 of a second embodiment of the invention.
Figure 7B:
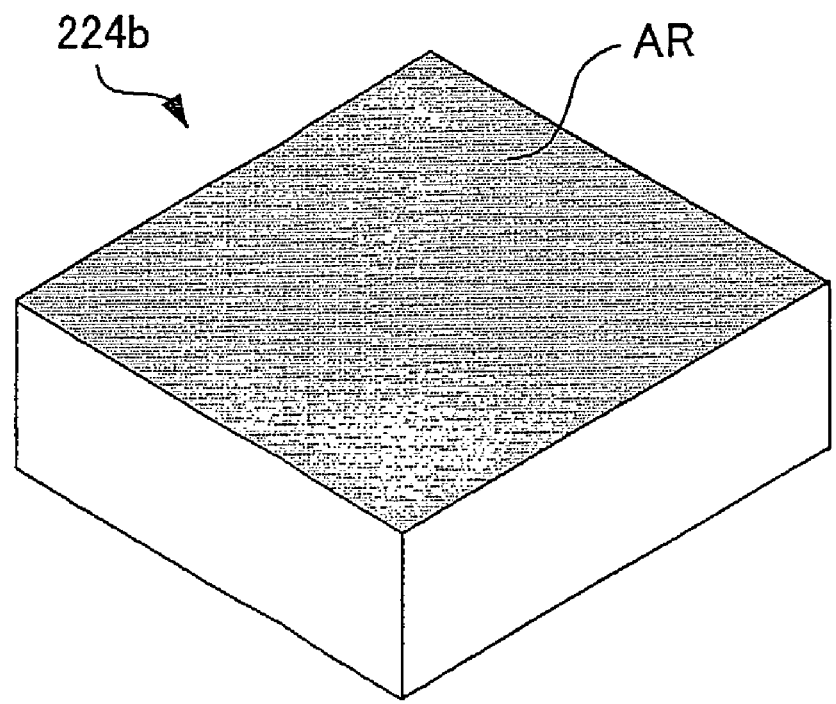

This Faraday rotator 224b is shown in FIGS. 7A and 7B (example 2-1). As shown in FIG. 7B, although an antireflection film AR is formed on the whole surface of the front surface (which may be replaced by the back surface. The same applies hereinafter) of the Faraday rotator 224b, as shown in FIG. 7A, an antireflection film AR is formed on the back surface (which may be replaced by the front surface. The same applies hereinafter) except for the vicinity of one corner part C.

In order to obtain the antireflection film AR as stated above, after the antireflection film AR is formed in the state where masking is provided in the vicinity of the corner part C, the masking is removed, or after the antireflection film AR is once formed on the whole surface, the antireflection film AR in the vicinity of the corner part C is removed (for example, etching). The specific contents of a manufacturing method will be described later. Incidentally, in FIGS. 7A and 7B, although the antireflection film AR is shown to be gray, and the body of the Faraday rotator 224b is shown on the colored background, it should be noted that an actual color is not reflected.

By irradiating the back surface with light, the portion where the antireflection film AR is formed and the portion where the antireflection film AR is not formed can be easily discriminated with the naked eye. Accordingly, the front and back surfaces of the Faraday rotator 224b can also be easily discriminated. Incidentally, the portion where the antireflection film AR is not formed is limited to the vicinity of the corner part C because the vicinity of the corner part C is not a portion through which light is transmitted, and the antireflection film AR is not originally required to be formed there.

Besides, in the example of FIG. 7A, although the antireflection film AR is formed except for the one corner part C, it is needless to say that the antireflection film AR can be formed except for the vicinities of two to four corner parts. Further, according to this embodiment, even if the same material is used as the material constituting the antireflection films AR on the front and back surfaces, the front and back surfaces can be discriminated.

Figure 8A:
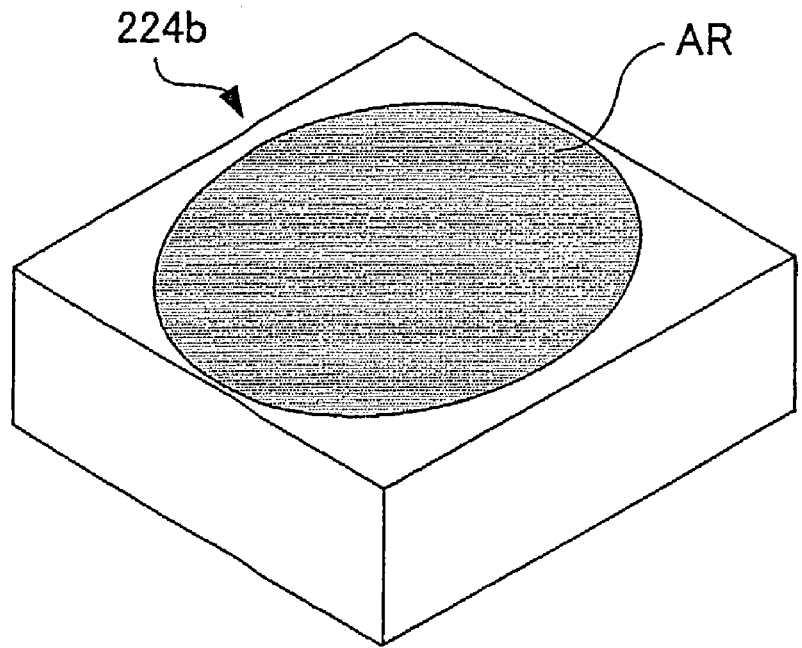
FIGS. 8A and 8B are views showing a Faraday rotator according to example 2-2 of the second embodiment of the invention.
Figure 8B:
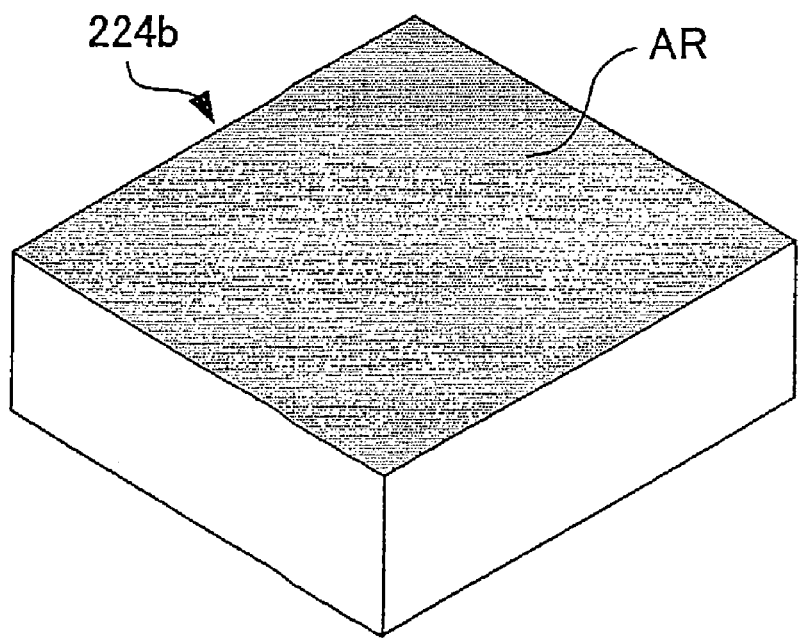

Next, another shape by which the front and back surfaces can be discriminated using the antireflection film AR will be shown in FIGS. 8A and 8B (example 2-2). As shown in FIG. 8A, in this shape, the antireflection film AR is formed to be circular on the front surface of the rotator body. It is necessary that this circular region includes a light transmission region. On the other hand, as shown in FIG. 8B, the antireflection film AR is formed on the whole surface of the back surface of the rotator body. Also by this shape, the region where the antireflection film AR is formed and the region where it is not formed can be discriminated by irradiating the surface of the rotator body with light. As a result, the front and back surfaces of the Faraday rotator 224b can be easily discriminated.

As stated above, the formation shape of the antireflection film AR is made different between the front and back surfaces of the Faraday rotator 224b, so that the front and back surfaces of the Faraday rotator 224b can be easily discriminated. Incidentally, in the above shape, although the antireflection film AR is formed on the whole surface of the back surface of the rotator body, this embodiment is not limited to this shape. For example, in the shape shown in FIGS. 7A and 7B, the formation shapes of the antireflection films AR on the front and back surfaces can be made different by forming such a shape that the antireflection film AR is not formed in the vicinities of two corner parts of the back surface. Besides, in the shape shown in FIGS. 8A and 8B, the formation shapes of the antireflection films AR on the front and back surfaces can be made different by forming the antireflection film AR on the back surface in a rectangular region including a light transmission region.

Next, a Faraday rotator 224b in which a front/back confirmation processing part is formed by carrying out machining will be described.

Figure 9:
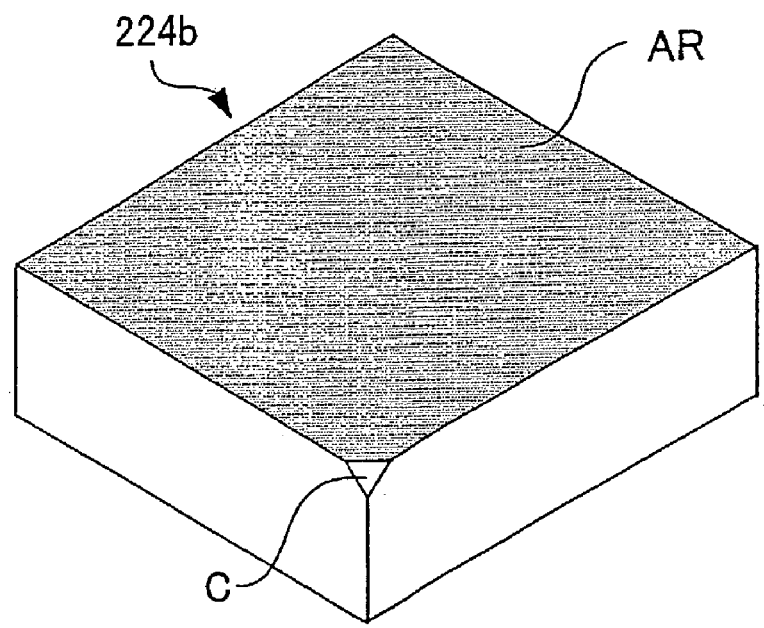
FIG. 9 is a view showing a Faraday rotator according to example 2-3 of the second embodiment of the invention.

FIG. 9 shows an example and a shape in which one corner part C of the front surface of the Faraday rotator 224b is chamfered (example 2-3). Incidentally, the back surface of the Faraday rotator 224b remains flat, and the antireflection film AR is formed on the whole surface. Also in the Faraday rotator 224b shown in FIG. 9, the front and back surfaces of the Faraday rotator 224b can be easily discriminated by forming the chamfer only on the front surface. Incidentally, in the example shown in FIG. 9, although only the front surface is chamfered, chamfers can be formed on both the front and back surfaces while the number thereof is made different from each other.

Figure 10:
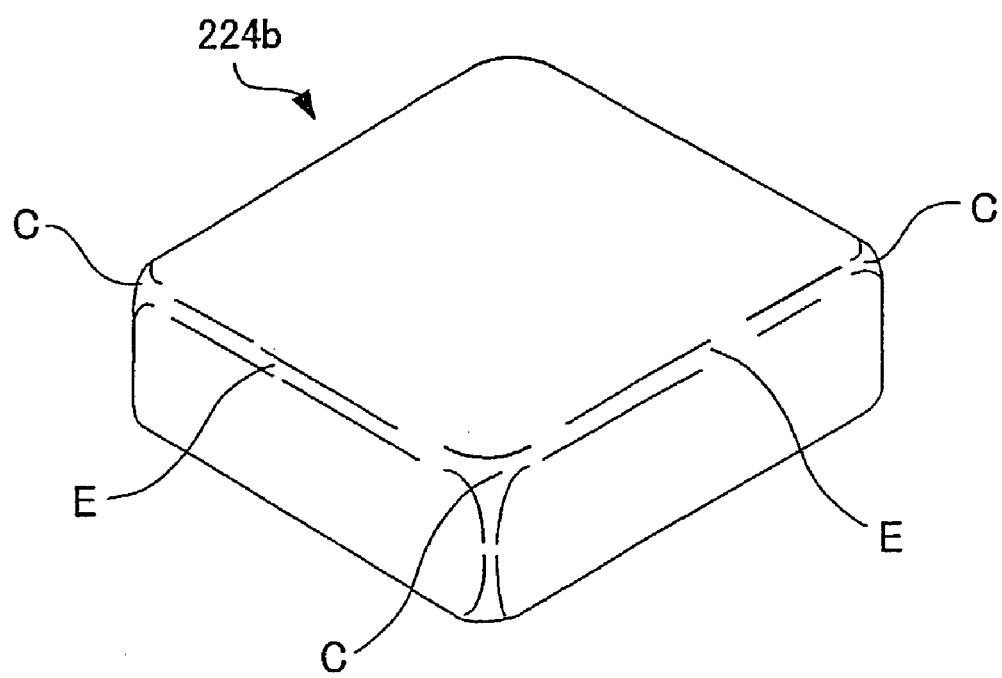
FIG. 10 is a view showing a Faraday rotator according to example 2-4 of the second embodiment of the invention.

FIG. 10 shows a modified example of FIG. 9, and all edge parts E of the Faraday rotator 224b are chamfered (example 2-4). Incidentally, in this example, the edge part E is a portion including an edge line existing between a corner part C and a corner part C. Further, the chamfer is round-machined, that is, is rounded. As stated above, the round-machined chamfers are formed in all the edge parts E in order to prevent deterioration of the characteristics of the Faraday rotator 224b, especially deterioration of the holding power.

That is, although the Faraday rotator 224b can be obtained by cutting a designated single crystal film as described later, chipping is apt to occur in the edge part E at the time of cutting, and the holding power tends to lower. On the other hand, when the edge part E is round-machined, the lowering of the holding power can be suppressed.

In the example of FIG. 10, the round-machined chamfers are formed on all the edge parts E of the Faraday rotator 224b, and the amount of chamfering of the chamfers of the surface belonging to the front surface is made larger than that of the chamfers of the surface belonging to the back surface. Thus, it becomes possible to discriminate between the front surface and the back surface by comparing the amount of chamfering.

Figure 11:
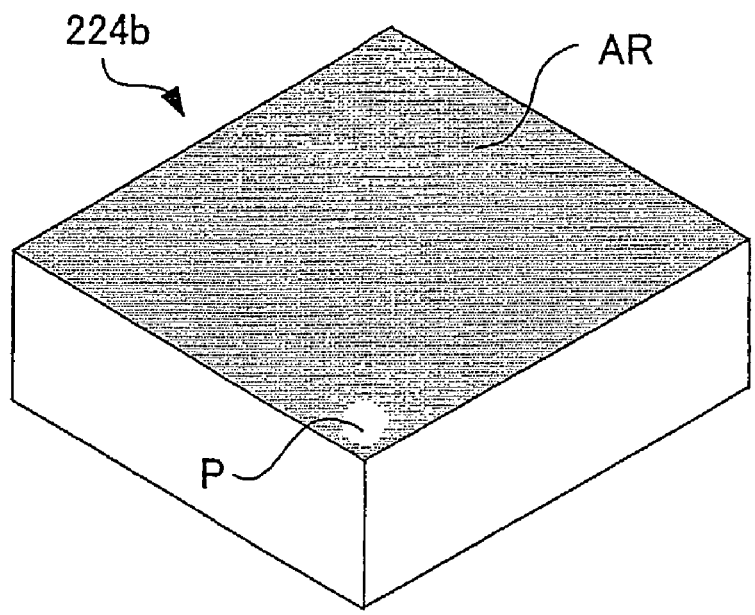
FIG. 11 is a view showing a Faraday rotator according to example 2-5 of the second embodiment of the invention.

FIG. 11 shows an example of a Faraday rotator 224*b* in which a front/back confirmation processing part is formed without carrying out machine work (example 2-5). In this example, a circular print P is formed in the vicinity of a corner part of the front surface of the Faraday rotator 224*b*. It is desirable to form the print P with a color clearly discriminated from the antireflection film AR.

Figure 12:
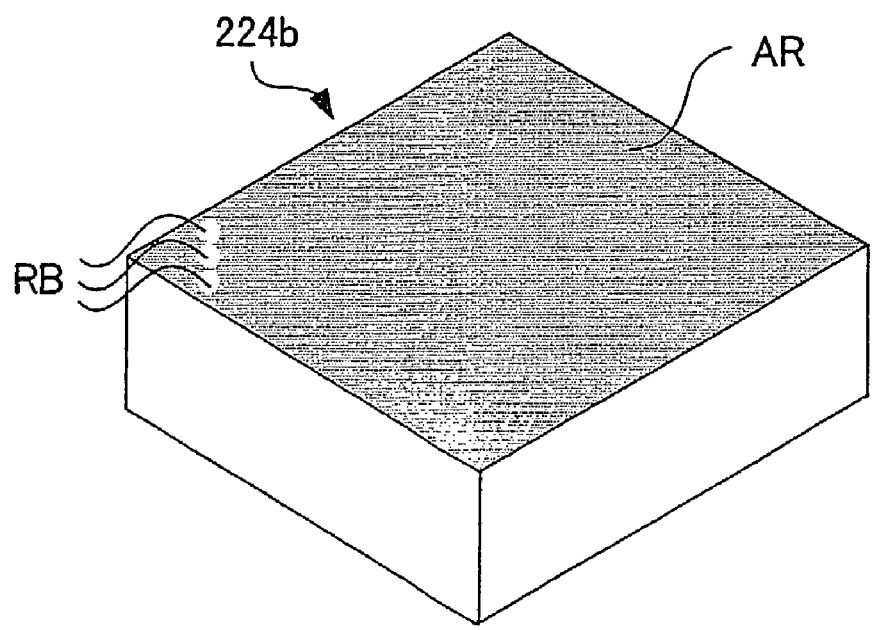
FIG. 12 is a view showing a Faraday rotator according to example 2-6 of the second embodiment of the invention.

Further, FIG. 12 also shows an example of a Faraday rotator 224*b* in which a front/back confirmation processing part is formed without carrying out machine work (example 2-6). In this example, an irradiation mark due to irradiation of a laser beam is formed in the vicinity of a corner part of the front surface of the Faraday rotator 224*b*. The irradiation of the laser beam may be performed in either case before and after the formation of the antireflection film AR. In the case where the laser beam is irradiated before the formation of the antireflection film AR, the irradiation mark is more hollow than other portions, so that it is possible to recognize the front surface. In the case where the laser beam is irradiated after the antireflection film AR is formed, in addition to the fact that the irradiation spot is more hollow than the other portions, also from the fact that the antireflection film AR is removed by the laser beam irradiation, it is possible to recognize the front surface.

Figure 13:
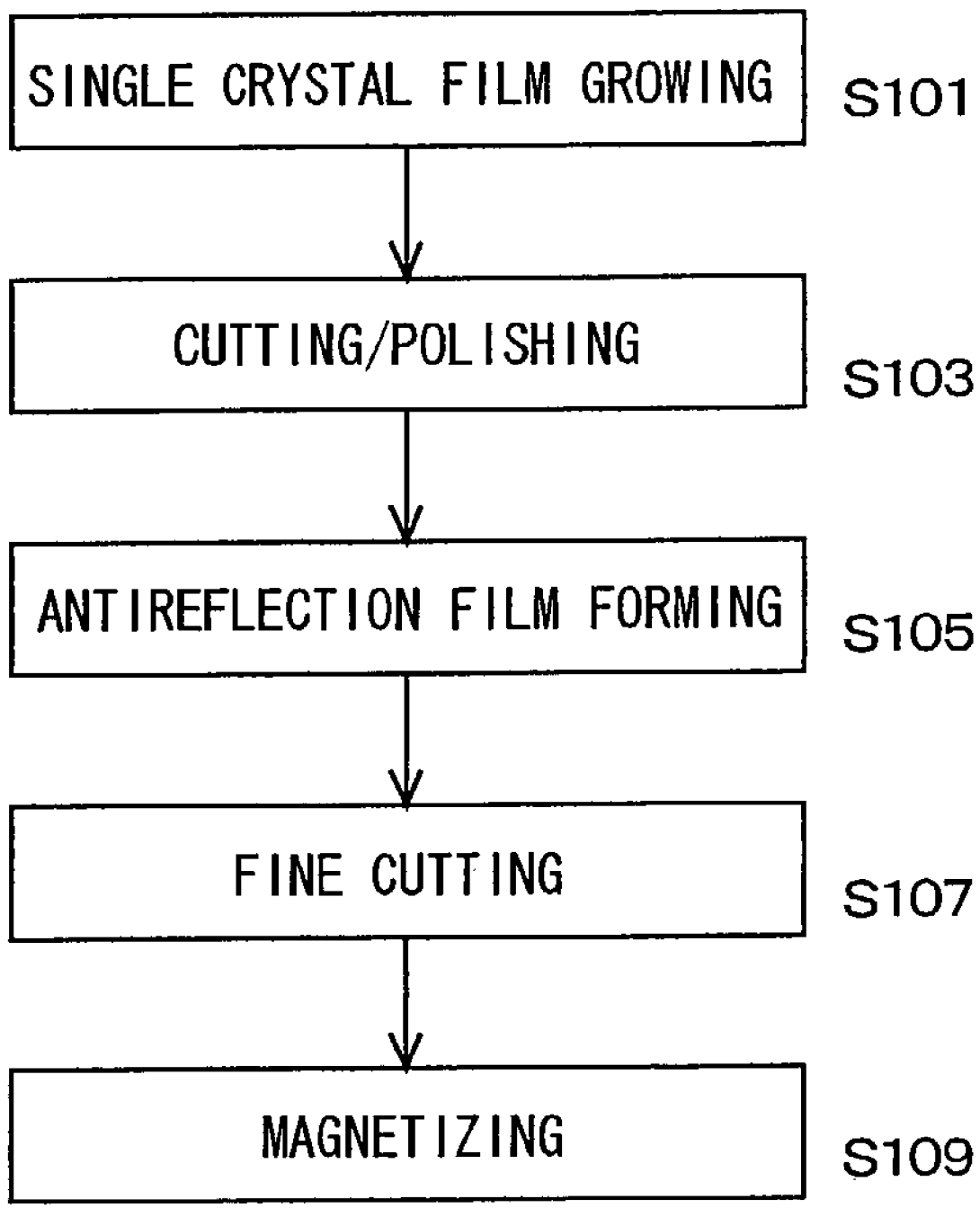
FIG. 13 is a flowchart showing a manufacturing process of a Faraday rotator according to the second embodiment of the invention.

Next, a manufacturing method of the Faraday rotator 224*b* of this embodiment will be described. As shown in FIG. 13, this embodiment includes a single crystal film growing step (step S101), a cutting/polishing step (step S103), an antireflection film forming step (step S105), a fine cutting step (step S107) and a magnetizing step (step S109). In the respective steps or between the respective steps, a front/back confirmation processing part formation step is carried out. Hereinafter, the respective steps will be described in sequence.

<Single Crystal Film Growing Step>

Since the single crystal film growing step (step S101) of this embodiment is the same as the single crystal film growing step (step S101) of the first embodiment, the description will be omitted.

<Cutting/Polishing Step>

Since the cutting/polishing step (step S103) of this embodiment is the same as the cutting/polishing step (step S103) of the first embodiment, the description will be omitted. Incidentally, the single crystal film 44 is cut into a size of about 10 mm×10 mm.

<Antireflection Film Forming Step>

After cutting and polishing are performed, in order to decrease insertion loss, the step proceeds to the antireflection film formation step (step S105) of forming the antireflection film AR on the front surface of the Faraday rotator 224*b*.

As the antireflection film AR, a well-known material, for example, $SiO_2$, $MgF_2$, $Al_2O_3$, $Ta_2O_5$, $ZrO_2$, $TiO_2$, $Nd_2O_3$ or $Y_2O_3$ can be used singly or in combination. As a method of forming the antireflection film AR, a vacuum evaporation method, an ion assist method, an ion plating method, or a sputtering method can be used.

<Fine Cutting Step>

After the antireflection film AR is formed, the step proceeds to the fine cutting step (step S107) of carrying out cutting into a predetermined size. For example, the single crystal film 44 having a size of 10 mm×10 mm at the stage where the antireflection film AR is formed is cut into a size of about 1 mm×1 mm. As a cutting technique in this fine cutting step, a well-known cutting technique such as a diamond saw or a wire saw can be used. Especially, the wire saw is suitable since the occurrence of chipping can be reduced. As the wire saw, for example, a diamond wire saw can be used. The diamond wire saw is such that beads of metal bond in which diamond grains are mixed are arranged and bonded to a special wire.

<Magnetizing Step>

After the fine cutting step, the step proceeds to the magnetizing step (step S109). In this magnetizing step, an external magnetic field is applied to the Faraday rotator 224*b* made of the single crystal film 44. Before this magnetizing step is performed, it is necessary that the front and back surfaces of the Faraday rotator 224*b* can be discriminated. This is for recognizing the magnetization direction after magnetization. Accordingly, at a stage after the single crystal film growing step (step S101) and before the magnetizing step, it is necessary to form the front/back confirmation processing part as described before. Incidentally, the magnetizing step can also be performed before the fine cutting step (S107).

In the above, the basic manufacturing process for obtaining the Faraday rotator 224*b* of this embodiment has been described. In the following, preferable examples of the manufacturing process intrinsic to the examples 2-1 to 2-6 shown in FIGS. 7 to 12 will be described.

Figure 14:
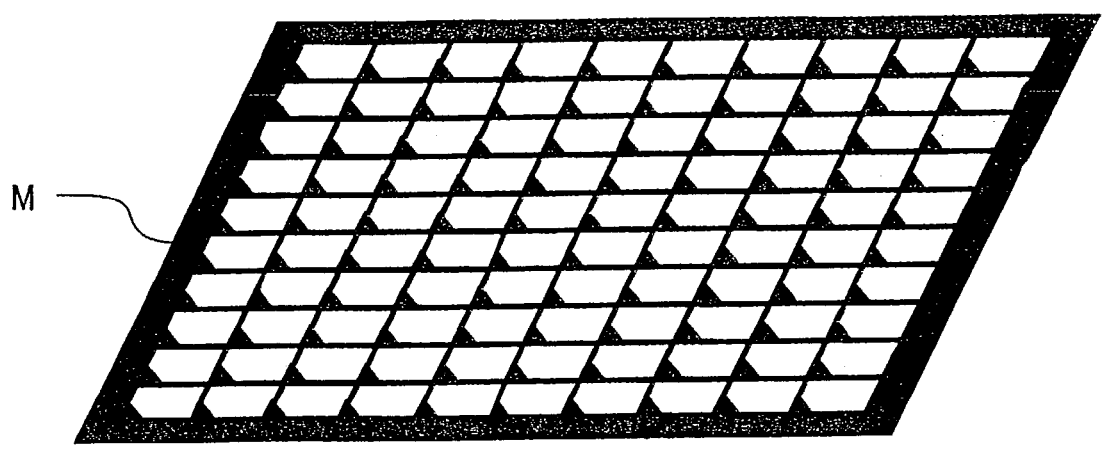
FIG. 14 is a view showing a manufacturing method of a Faraday rotator according to the example 2-1 of the second embodiment of the invention.

With respect to the Faraday rotator 224*b* according to the example 2-1 (see FIG. 7), as shown in FIG. 14, a mask M in which regions where the antireflection films AR are to be formed are punched is stacked on the single crystal film 44 having a size of, for example, 10 mm×10 mm, and the antireflection film AR is formed in that state. Incidentally, on the surface opposite to the surface on which the mask M is stacked, the antireflection film AR is formed on the whole surface without providing a mask M.

Figure 15:
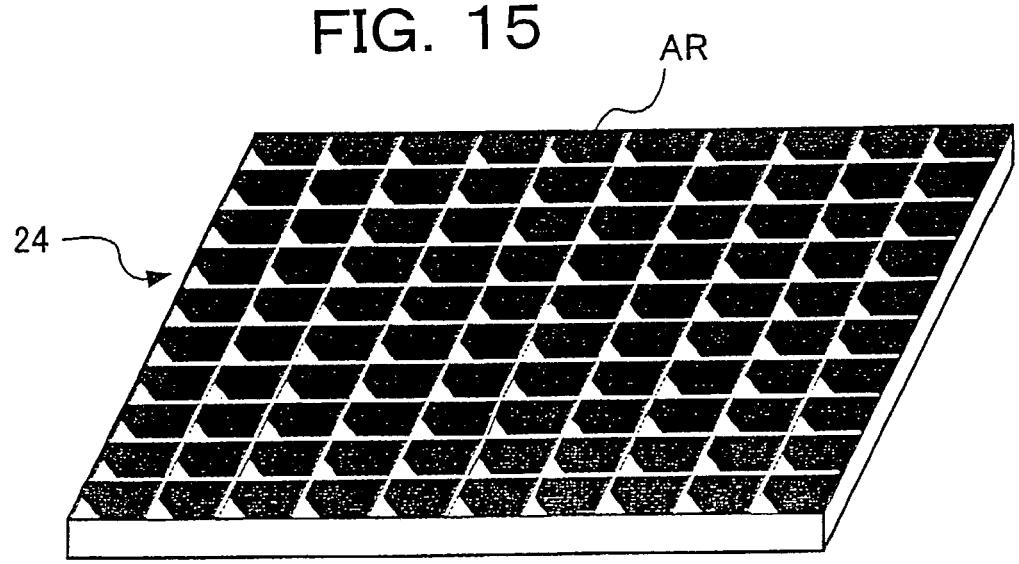
FIG. 15 is a view showing the manufacturing method of the Faraday rotator according to the example 2-1 of the second embodiment of the invention.

In the single crystal film 44 on which the antireflection film AR is formed, as shown in FIG. 15, the antireflection film AR is formed except for portions (portions on a colored background) where formation of the antireflection film AR is prevented by the mask M. The single crystal film 44 in the state shown in FIG. 15 is next supplied to the fine cutting step (step S107 of FIG. 13).

Also with respect to the Faraday rotator 224*b* according to the example 2-2 (FIG. 8), the antireflection film AR can be formed only in the predetermined region of the surface by the same method as the example 2-1 described above.

With respect to the Faraday rotator 224*b* according to the example 2-3 (FIG. 9), after cutting in the fine cutting step (step S107 of FIG. 13), chamfers can be formed by, for example, using a microgrinder driven by air or performing laser beam irradiation.

With respect to the Faraday rotator 224*b* according to the example 2-4 (FIG. 10), after the fine cutting step (step S107 of FIG. 13), the edge part E of the Faraday rotator 224*b* is first round-machined by barrel polishing. After the barrel polishing is performed, similarly to the example 2-1, by a microgrinder, laser beam irradiation, or the like, the chamfering size of an edge part E belonging to the front side is made larger than the chamfer of a surface belonging to the back side.

Figure 16:
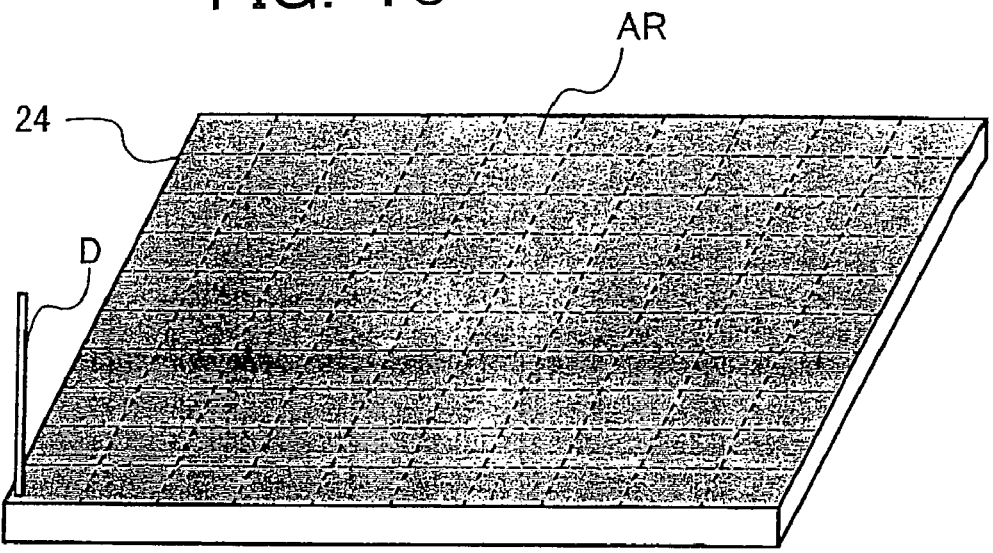
FIG. 16 is a view showing a manufacturing method of a Faraday rotator according to the example 2-5 of the second embodiment of the invention.

With respect to the Faraday rotator 224*b* according to the example 2-5 (FIG. 11), as shown in FIG. 16, after the antireflection film forming step (step S105 of FIG. 13) is ended, in the state of the single crystal film 44 in which the antireflection film AR is formed, a dot matrix printer (FIG. 16 shows only one dot wire D) is used to perform printing. In the state of the single crystal film 44, printing is performed by the dot wire D for each region constituting the Faraday rotator 224b. Portions on a colored background in FIG. 16 show the printing. Incidentally, in this example, although the dot matrix printer has been stated, another equipment such as an ink jet printer can also be used.

Figure 17:
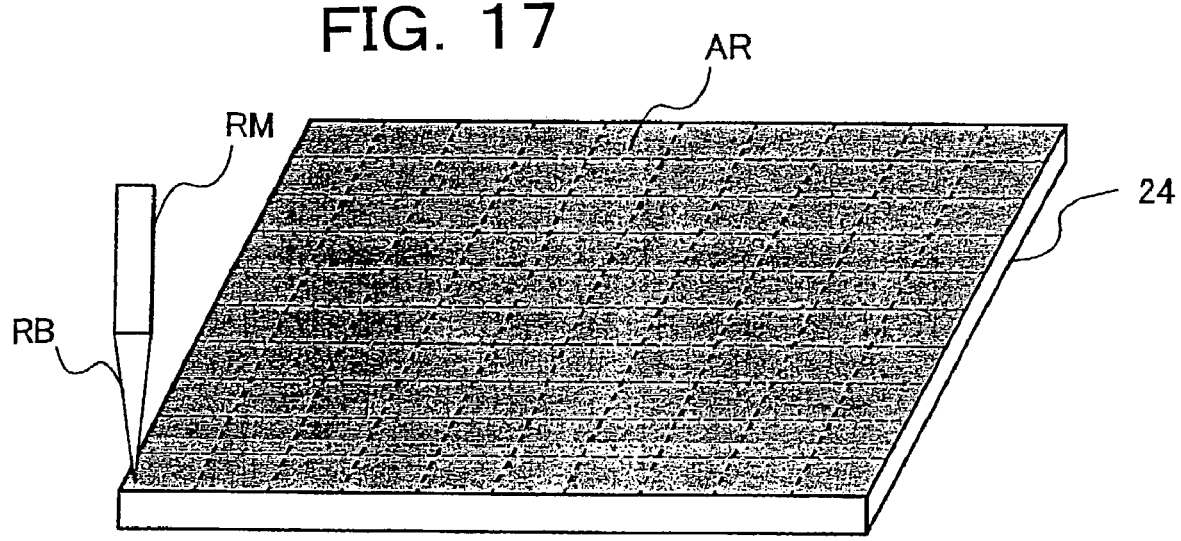
FIG. 17 is a view showing a manufacturing method of a Faraday rotator according to the example 2-6 of the second embodiment of the invention.

With respect to the Faraday rotator 224b according to the example 2-6 (FIG. 12), after the antireflection film forming step (step S105 of FIG. 13) is ended, irradiation of the laser beam RB is performed in the state of the single crystal film 44 in which the antireflection film AR is formed. FIG. 17 shows the state, and the laser beam RB is irradiated from a laser beam irradiation apparatus RM to form an irradiation mark for every region constituting the Faraday rotator 224b, and then, the step proceeds to the fine cutting step (step S107 of FIG. 13).

Hereinafter, specific examples of this embodiment will be described.

EXAMPLE 2-1

Bismuth oxide ($Bi_2O_3$, 4N), ferric oxide ($Fe_2O_3$, 4N), gadolinium oxide ($Gd_2O_3$, 5N), terbium oxide ($Tb_4O_7$, 3N), ytterbium oxide ($Yb_2O_3$, 4N), and gallium oxide ($Ga_2O_3$, 4N) were used as raw materials, and the apparatus shown in FIG. 5 was used to grow, by epitaxial growth, a bismuth substitutional rare earth iron garnet single crystal film.

An LPE substrate used is made of (111) garnet single crystal (($GdCa)_3(GaMgZr)_5O_{12}$). The lattice constant of this substrate is 1.2497±0.0002 nm. Incidentally, the raw materials are selected so that the single crystal film 44 exhibits the hard magnetism after it is magnetized. In addition to the above raw materials, lead oxide (PbO, 4N) and boron oxide ($B_2O_3$, 5N) were put as flux into the crucible 40 made of platinum.

After the bismuth substitutional rare earth iron garnet single crystal film was grown, composition analysis of the obtained single crystal film 44 was performed, and the result was $B_{1.0}Gd_{0.3}Tb_{1.5}Yb_{0.2}Fe_{4.2}Ga_{0.8}O_{12.0}$.

The obtained single crystal film 44 was made to have a size of 10 mm×10 mm×500 μm by cutting and polishing. The antireflection film AR was formed on the cut and polished single crystal film 44 by the method shown in FIG. 14 and by an ion assisted vacuum evaporation method. Incidentally, as material of the antireflection film AR, $Ta_2O_5$ and $SiO_2$ were used and were stacked on the single crystal film 44 in this order. After the antireflection film AR was formed, a diamond wire saw was used to perform cutting into a size of 1 mm×1 mm, so that the Faraday rotator 224b was obtained.

The magnetizing treatment was performed to the obtained Faraday rotator 224b in an external magnetic field of 10 kOe. At the time of this magnetizing treatment, attention was paid so that the magnetization directions are coincident with each other between the front and back surfaces different in the formation shape of the antireflection film AR. After the magnetizing treatment was completed, together with the polarizers 224a and 224c, it was assembled as the optical isolator 224. At this time, while the front and back surfaces of the Faraday rotator 224b was confirmed, the assembling operation was performed.

When the characteristics of the thus assembled optical isolator 224 was measured, the insertion loss was 0.08 dB, and the optical extinction ratio was 40 dB. Besides, there was no error of the front and back surfaces of the Faraday rotator 224b, and the product yield was 100%. Incidentally, in the case of the Faraday rotator 224b in which the formation shapes of the antireflection films AR were not made different, the product yield was about 80% because of an error of the front and back surfaces.

EXAMPLE 2-2

By the same method as the example 2-1, the single crystal film 44 was subjected to the cutting/polishing step (step S103 of FIG. 13), the formation of the antireflection film AR, and the fine cutting step (step S107 of FIG. 13), so that the Faraday rotator 224b with a size of 1 mm×1 mm was obtained. With respect to this Faraday rotator 224b, a microgrinder was used to chamfer one corner part C of the surface as shown in FIG. 9.

With respect to the chamfered Faraday rotator 224b, the magnetizing treatment was performed by the same method as the example 2-1. The Faraday rotator 224b to which the magnetizing treatment was performed was used to assemble the optical isolator 224 similarly to the example 2-1, and the characteristics were measured. As a result, the insertion loss was 0.08 dB, and the optical extinction ratio was 40 dB. Besides, there was no error of the front and back surfaces of the Faraday rotator 224b, and the product yield was 100%.

Figure 18:
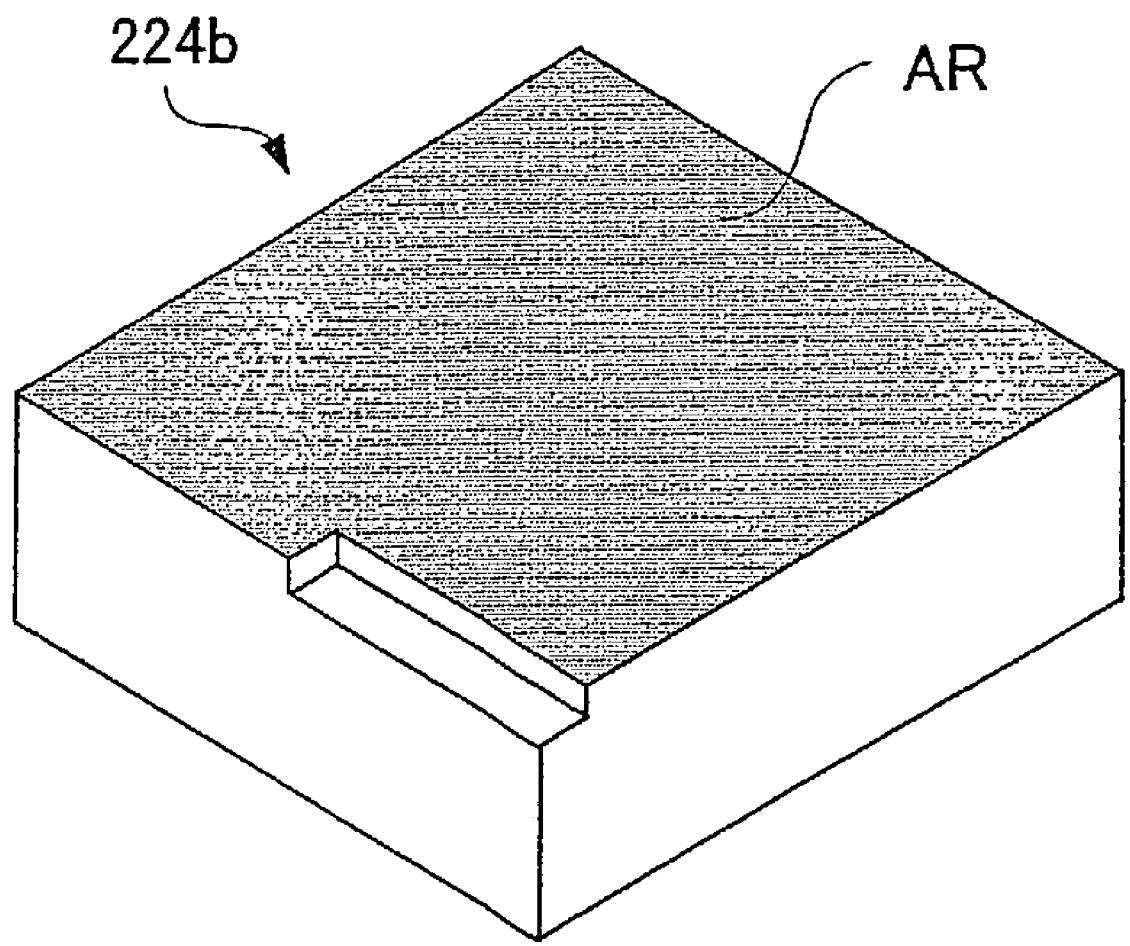
FIG. 18 is a view showing a Faraday rotator of a comparative example.
Figure 19:
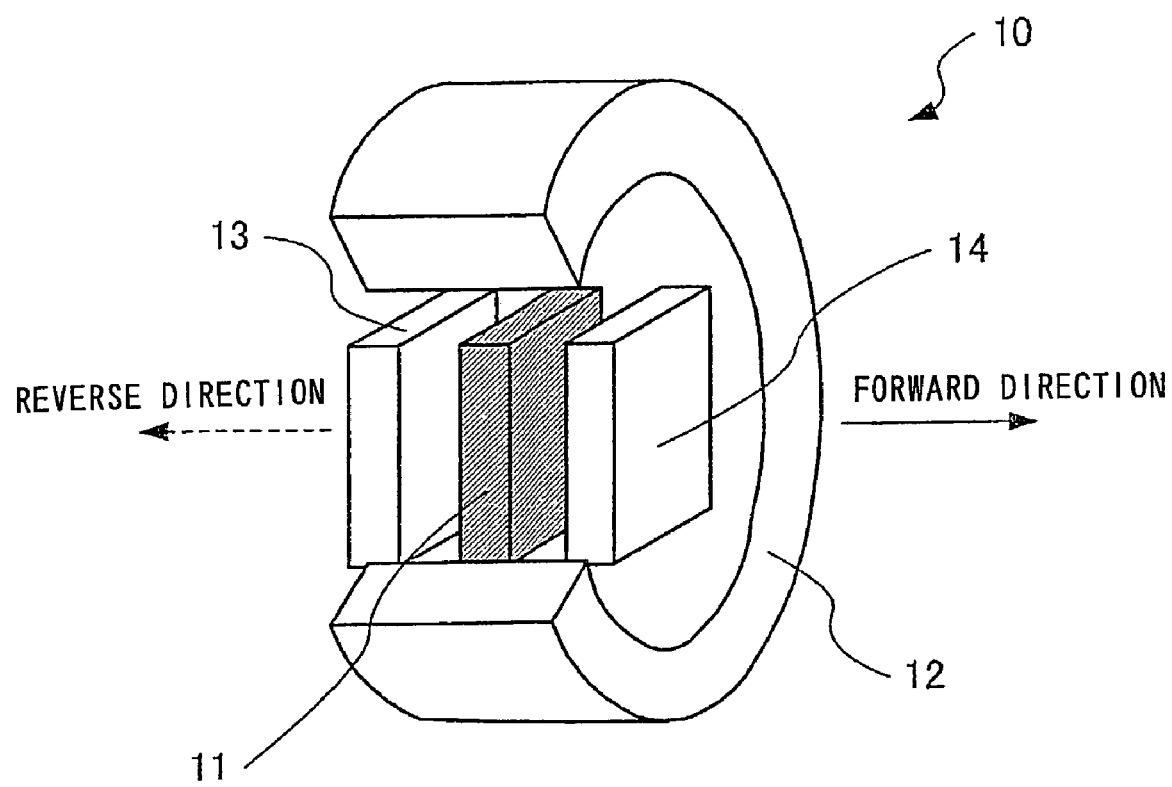
FIG. 19 is a view showing a structure of a conventional optical isolator.

As a comparative example 2-1, the Faraday rotator 224b with a size of 1 mm×1 mm was machined using a microgrinder into a shape as shown in FIG. 18. The holding powers of this Faraday rotator 224b, the Faraday rotator 224b in which chamfering of a corner part was not performed, and the Faraday rotator 224b according to the example 2-2 were measured.

As a result, while the holding power of the Faraday rotator 224b in which the chamfering of the corner part was not performed was 500 Oe, the magnetic hysteresis became asymmetric and the holding power was also dropped (200 Oe and 400 Oe) in the Faraday rotator 224b machined into the shape shown in FIG. 18, and therefore, it was confirmed that the latter was unsuitable as the hard magnetic Faraday rotator 224b. On the other hand, the holding power of the Faraday rotator 224b according to the example 2-2 was 490 Oe, and a slight drop in the holding power was merely confirmed.

EXAMPLE 2-3

By the same method as the example 2-1, the single crystal film 44 was subjected to the cutting/polishing step (step S103 of FIG. 13), the formation of the antireflection film AR, and the fine cutting step (step S107 of FIG. 13), so that the Faraday rotator 224b with a size of 1 mm×1 mm was obtained.

After this Faraday rotator 224b was processed by a barrel polishing apparatus, as shown in FIG. 10, a chamfer size of one corner part C of the surface was made large by using a microgrinder. With respect to the chamfered Faraday rotator 224b, the magnetizing treatment was performed by the same method as the example 2-1. The Faraday rotator 224b to which the magnetizing treatment was performed was used to assemble the optical isolator 224 similarly to the example 2-1, and the characteristics were measured. As a result, the insertion loss was 0.08 dB, and the optical extinction ratio was 40 dB. Besides, there was no error of the front and back surfaces of the Faraday rotator 224b, and the product yield was 100%.

EXAMPLE 2-4

By the same method as the example 2-1, the single crystal film 44 was cut and polished to have a size of 10 mm×10 mm×500 μm. The antireflection film AR was formed on the cut and polished single crystal film 44 by an ion assisted vacuum evaporation method. Incidentally, as a material of the antireflection film AR, $Ta_2O_5$ and $SiO_2$ were used and were stacked on the single crystal film 44 in this order.

After the antireflection film AR is formed, printing was performed using a dot impact printer as shown in FIG. 16. The size of the printing is 50 μm in diameter and ink used was white. After the printing was ended, a diamond wire saw was used to perform cutting into a size of 1 mm×1 mm, and thereafter, similarly to the example 2-1, the optical isolator 224 was assembled and the characteristics were measured. As a result, the insertion loss was 0.08 dB, and the optical extinction ratio was 40 dB. Besides, there was no error of the front and back surfaces of the Faraday rotator 224b, and the production yield was 100%.

By the same method as the example 2-1, the single crystal film 44 was cut and polished to have a size of 10 mm×10 mm×500 μm. The antireflection film AR was formed on the cut and polished single crystal film 44 by an ion assisted vacuum evaporation method. Incidentally, as the material of the antireflection film AR, $Ta_2O_5$ and $SiO_2$ were used and were stacked on the single crystal film 44 in this order.

After the antireflection film AR was formed, irradiation of a laser beam RB was performed as shown in FIG. 17. As the laser beam irradiation apparatus RM, a UV laser apparatus for machining was used. Since the UV laser has a short wavelength, it has a merit that a fine and shallow machining mark without the influence of heat can be realized.

After the irradiation of the laser beam RB was completed, a diamond wire saw was used to perform cutting into a size of 1 mm×1 mm, and thereafter, similarly to the example 2-1, the optical isolator 224 was assembled, and the characteristics were measured. As a result, the insertion loss was 0.08 dB and the optical extinction ratio was 40 dB. Besides, there was no error of the front and back surfaces of the Faraday rotator 224b, and the production yield was 100%.

As described above, according to this invention, the high performance optical device can be obtained by the simple method.

Besides, as described above, by adopting the front/back confirmation technique of the invention, the certainty of discrimination of the front and back is remarkably improved, and deterioration of characteristics as the Faraday rotator can be suppressed to the minimum.

What is claimed is:

1. An optical device comprising:
    a first optical element on which forward direction light is incident;
    a second optical element which is disposed a predetermined distance away from the first optical element and is opposite thereto and from which the forward direction light emerges;
    a Faraday rotator disposed between the first optical element and the second optical element and rotating a polarization plane of light transmitted through the first optical element to emit the light to the second optical element; and
    a member for fixing the Faraday rotator,
    wherein the Faraday rotator is made of a bismuth substitutional rare earth iron garnet single crystal film exhibiting a rectangular magnetic hysteresis, and is fixed to the member by a fixing agent having a melting point not lower than a Curie point of the Faraday rotator.

2. An optical device according to claim 1, wherein the first optical element and the second optical element are polarizers.

3. An optical device according to claim 1, wherein the fixing agent is solder or low melting point glass.

4. An optical communication system comprising:
    an optical transmitter for emitting an optical signal converted from an electric signal;
    an optical transmission line for transmitting the optical signal emitted from the optical transmitter; and
    an optical receiver for receiving the optical signal transmitted through the optical transmission line and converting the received optical signal into an electric signal,
    wherein the optical transmitter includes:
    an electric-optical conversion element for converting the electric signal into the optical signal; and
    an optical device disposed between the electric-optical conversion element and the optical transmission line, and
    wherein a Faraday rotator constituting the optical device is made of a bismuth substitutional rare earth iron garnet single crystal film exhibiting a rectangular magnetic hysteresis, and is fixed to a member by a fixing agent having a melting point of not lower than a Curie point of the Faraday rotator.

* * * * *